(12) United States Patent
Hosokawa et al.

(10) Patent No.: US 9,688,810 B2
(45) Date of Patent: Jun. 27, 2017

(54) RESIN, RESIN COMPOSITION AND METHOD FOR PRODUCING THE SAME, AND TONER USING THIS RESIN COMPOSITION

(71) Applicant: FUJIFILM Corporation, Minato-ku, Tokyo (JP)

(72) Inventors: Takafumi Hosokawa, Ashigarakami-gun (JP); Kiyotaka Fukagawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 359 days.

(21) Appl. No.: 14/162,919

(22) Filed: Jan. 24, 2014

(65) Prior Publication Data
US 2014/0141369 A1 May 22, 2014

Related U.S. Application Data

(63) Continuation of application No. PCT/JP2012/068600, filed on Jul. 23, 2012.

(30) Foreign Application Priority Data

Jul. 26, 2011 (JP) ................................. 2011-163683

(51) Int. Cl.
*C08G 63/181* (2006.01)
*C08G 63/183* (2006.01)
(Continued)

(52) U.S. Cl.
CPC ......... *C08G 63/183* (2013.01); *C08G 63/181* (2013.01); *C08G 63/185* (2013.01);
(Continued)

(58) Field of Classification Search
CPC .......... G03G 9/08755; G03G 9/08791; C08G 63/181; C08G 63/183; C08G 63/185; C08G 8/34; C08G 63/187
See application file for complete search history.

(56) References Cited

U.S. PATENT DOCUMENTS 8,748,561 B2 *  6/2014  Sato ..................... C07C 67/313
                                                         430/109.4
2010/0063204 A1   3/2010  Hamasaki et al.
(Continued)

FOREIGN PATENT DOCUMENTS

CN    101317135 A    12/2008
CN    101598911 A    12/2009
(Continued)

OTHER PUBLICATIONS

Perry A. Wilbon et al., "Renewable Rosin Acid-Degradable Caprolactone Block Copolymers by Atom Transfer Radical Polymerization and Ring-Opening Polymerization", Macromolecules Oct. 13, 2010, pp. 8747-8754, vol. 43, No. 21.
(Continued)

*Primary Examiner* — Ling Choi
*Assistant Examiner* — David L Miller
(74) *Attorney, Agent, or Firm* — Sughrue Mion, PLLC

(57) ABSTRACT

A resin composed of a particular polymer, the particular polymer including a repeating unit containing a structure derived from a dehydroabietic acid, a specific structural unit, and a specific aromatic ring-containing structural unit in the main chain.

11 Claims, 1 Drawing Sheet

(51) Int. Cl.
  *C08G 63/185* (2006.01)
  *C08G 63/187* (2006.01)
  *G03G 9/087* (2006.01)

(52) U.S. Cl.
  CPC ....... *C08G 63/187* (2013.01); *G03G 9/08755* (2013.01); *G03G 9/08791* (2013.01); *G03G 9/08795* (2013.01); *G03G 9/08797* (2013.01)

(56) References Cited

U.S. PATENT DOCUMENTS

| | | | | |
|---|---|---|---|---|
| 2012/0101250 | A1* | 4/2012 | Sakuma | C07C 51/00 528/298 |
| 2012/0322969 | A1* | 12/2012 | Sato | C07C 67/313 528/298 |
| 2013/0281619 | A1* | 10/2013 | Uehira | C08G 63/199 524/604 |

FOREIGN PATENT DOCUMENTS

| | | | |
|---|---|---|---|
| CN | 102103339 A | 6/2011 | |
| JP | 2008-120919 A | 5/2008 | |
| JP | 2008-165017 A | 7/2008 | |
| JP | 2008-208196 A | 9/2008 | |
| JP | 2009-3136 A | 1/2009 | |
| JP | 2009-120542 A | 6/2009 | |
| JP | 2010-20170 A | 1/2010 | |
| JP | 2010-210959 A | 9/2010 | |
| JP | WO 2010150847 A1 * | 12/2010 | ............ C07C 51/00 |
| JP | 2011-2802 A | 1/2011 | |
| JP | 2011-26569 A | 2/2011 | |
| JP | 2011-74249 A | 4/2011 | |
| JP | 2011-116997 A | 6/2011 | |
| JP | 2011-137167 A | 7/2011 | |
| JP | 2011137167 A * | 7/2011 | |
| JP | WO 2011096145 A1 * | 8/2011 | ........... C07C 67/313 |
| JP | WO 2012086713 A1 * | 6/2012 | ........... C08G 63/199 |

OTHER PUBLICATIONS

International Search Report for PCT/JP2012/068600 dated Aug. 21, 2012.

Communication dated Dec. 24, 2014 from the State Intellectual Property Office of The People's Republic of China in counterpart Chinese Patent Application No. 201280046471.5.

\* cited by examiner

DSC chart of polymer P-8

RESIN, RESIN COMPOSITION AND METHOD FOR PRODUCING THE SAME, AND TONER USING THIS RESIN COMPOSITION

TECHNICAL FIELD

The present invention relates to a resin, a resin composition and a method for producing the same, and a toner using this resin composition.

BACKGROUND ART

Electrophotography applied to copying machines and the like has now been widely popularized. According to this technology, the machines can produce a large number of copies, instantly, not limited in black and white images, rather in good color images. This electrophotography is typically carried out by the apparatuses and processes described below (see FIG. 1). First, the surface of a photoreceptor (latent image holding body) 1 that utilizes a photoconductive material is charged by a charging means 8, and the charged surface is subjected to exposure L to electrically form a latent image. To the latent image formed here, toner is applied from a drum 3 housed in a toner supply chamber 2, and a toner image is formed. At this time, the toner 5 is charged oppositely to the charge of the photoreceptor. Thereafter, this toner image is transferred onto the surface of a transfer receiver such as paper 4, through an intermediate transfer body (not shown in the diagram) if necessary. When this transferred image 51 is fixed by means of heating, pressing, solvent vapor or the like, a desired image can be obtained. The toner remaining on the photoreceptor surface described above is cleaned by a cleaner 7 as necessary, and is used again for the development of toner images. Furthermore, charge of the photoreceptor is eliminated by a charge remover 9 in order to make the photoreceptor prepare for the following copying process.

In recent years, as a result of the technical progress in the field of electrophotography, the electrophotographic process has come to be used in printing applications as well as copying machines and printers. There is an increasingly tougher demand for the speeding-up of apparatuses, increased reliability, and copies having high image quality and hues equivalent to the original print. There have been innumerable approaches taken in order to enhance such required performance, but for example, Patent Literature 1 discloses an attempt to reduce the difference or unevenness of glossiness in the chemical toner.

CITATION LIST

Patent Literatures

Patent Literature 1: JP-A-2008-165017 ("JP-A" means unexamined published Japanese patent application)
Patent Literature 2: JP-A-2010-20170
Patent Literature 3: JP-A-2010-210959
Patent Literature 4: JP-A-2009-3136
Patent Literature 5: JP-A-2011-2802

DISCLOSURE OF INVENTION

Technical Problem

On the other hand, toner is formed by including a resin which contains a polymeric compound as a main component, and its influence on the environment in connection with the production of toner is not negligible. Since toner does not have an external appearance such as a molded body, the influence is highly likely to be overlooked, but there is a high possibility of an improvement in environmental suitability as a resin product that is consumed in large amounts. For the toners that are currently distributed, usually polymers originating from fossil fuels are used, and from the viewpoint of the environmental problems of today, replacement of the polymers by polymers originating from natural resources, which can reduce the volume of carbon dioxide emissions on a conversion basis, is desirable.

There are examples of making use of rosin components or rosin esters, which are natural materials, in toner material (see Patent Literatures 2 to 5). According to these examples, replacement by the aforementioned natural materials can be realized. However, according to the verification of the inventors of the present invention, satisfactory performance in terms of compatibility with the resins used in combination or glossiness cannot be obtained with the above-described toner materials, and there has been a demand for a resin with further improved characteristics.

The applicant previously paid attention to abietane-based compounds originating from natural resources, and they succeeded in obtaining polymers having these compounds incorporated into the main chains. Then, the applicant checked the properties of the polymers and found that high heat resistance and moisture resistance/water resistance can be exhibited (JP-A-2011-26569 and JP-A-2011-74249). Through the research and development conducted thereafter, the applicant succeeded in exhibiting properties that are suitable as toner materials by changing the polymers to copolymers having particular structures. It can be said that in the toner applications where a relatively lower fixing temperature is required, this is to meet the needs in the characteristic domain that is rather opposite to the suggestion of a polymer having high heat resistance that realizes the high Tg described above.

That is to say, the present invention addresses to the provision of a resin which can contribute to the preservation of the global environment by using a compound of plant origin, can impart excellent suitability at the production of a toner and can exhibit satisfactory performance in the use of a toner. Further, the present invention addresses to the provision of a resin composition and a method for producing the resin composition and a toner using this resin composition.

Solution to Problem

The problem has been solved by the following means.
(1) A resin composed of a particular polymer, the particular polymer comprising: a repeating unit containing a structure derived from a dehydroabietic acid, a structural unit represented by the following formula (I), and an aromatic ring-containing structural unit represented by the following formula (IIa) in the main chain:

(I)

wherein, in formula (I), $G^1$ represents an alkylene group or alkenylene group having a total carbon number of 4 or greater; X, Y, and Z each independently represent a divalent linking group selected from the group consisting of —O—, —S—, —NR—, —(C=O)—, —O(C=O)—, —(C=O)O—, —(C=O)NR—, and any combination thereof; R is a hydrogen atom, an alkyl group or an alkenyl group; the total carbon number is meant to include, when the alkylene group or alkenylene group has a substituent, the number of carbon atoms of that substituent; mz represents an integer of 0 to 3; and * represents a bond incorporated in its main chain:

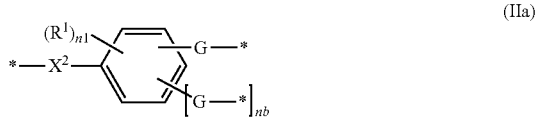

(IIa)

wherein, in formula (IIa), $R^1$ represents a substituent; $X^2$ represents a divalent linking group; G represents a divalent linking group; n1 represents an integer of 0 to 4; nb represents an integer of 0 to 3; and * represents a bond incorporated in its main chain.

(2) The resin described in item (1), wherein the dehydroabietic acid-derived structure comprises a structure represented by the following formula (U):

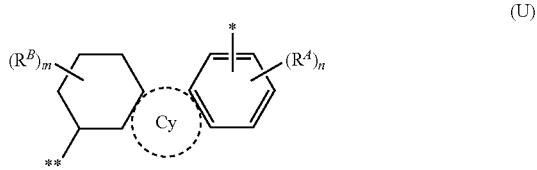

(U)

wherein $R^A$ and $R^B$ represent an alkyl group or an alkenyl group having 1 to 6 carbon atom(s); n represents an integer of 0 to 3; m represents an integer of 0 to 5; ring Cy represents a saturated or unsaturated six- or seven-membered ring optionally containing a heteroatom; * and ** each represent a bond incorporated in its main chain; and * may be a bond stretching from $R^A$.

(3) The resin described in item (1) or (2), wherein the dehydroabietic acid-derived structure is a repeating unit represented by the following formula A1 or A2:

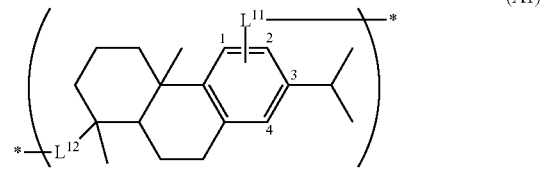

(A1)

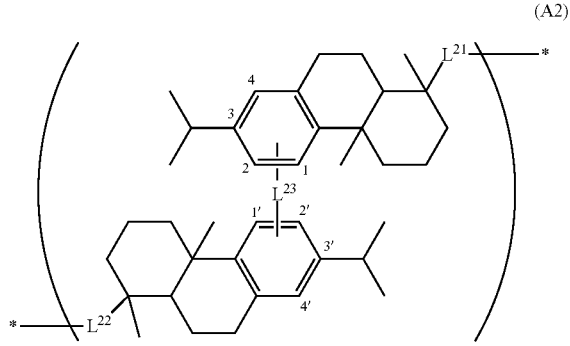

(A2)

wherein, in formulae A1 and A2, $L^{11}$, $L^{12}$, $L^{21}$, $L^{22}$ and $L^{23}$ represent a divalent linking group; and * represents a bond.

(4) The resin described in any one of the above items (1) to (3), wherein $L^{21}$ and $L^{22}$ in formula (A2) each are —(C=O)—* or —(C=O)O—*; and * represents the site of a bond in the formula.

(5) The resin described in any one of the above items (1) to (3), wherein $L^{12}$ in formula (A1) is —(C=O)—*, and $L^{11}$ is -$L^{13}$-(C=O)—* or —(C=O)-$L^{13}$-*; * represents the site of a bond in the formula; and $L^{13}$ represents a divalent linking group.

(6) The resin described in any one of the above items (1) to (5), wherein the content percentage of the aromatic ring of the aromatic ring-containing structural unit in the particular polymer is from 5% by mass to 30% by mass relative to the total amount of the resin.

(7) The resin described in any one of the above items (1) to (6), wherein the aromatic ring-containing structural unit represented by formula (IIa) is an aromatic ring-containing structural unit represented by represented by the following formula (II):

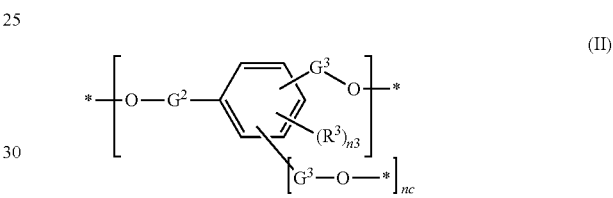

(II)

wherein $G^2$ and $G^3$ each represent a divalent linking group; $R^3$ represents a substituent; n3 represents an integer of 0 to 4; nc represents an integer of 0 to 3; and * represents a bond incorporated in its main chain.

(8) The resin described in any one of the above items (1) to (7), wherein the aromatic ring-containing structural unit represented by formula (IIa) is an aromatic ring-containing structural unit represented by formula (III):

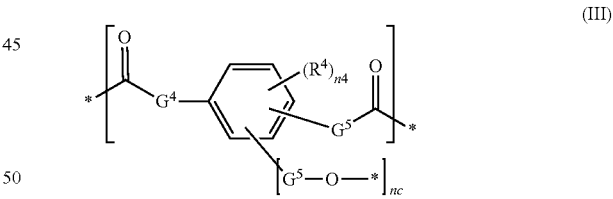

(III)

wherein $G^4$ and $G^5$ each represent a divalent linking group; $R^4$ represents a substituent; n4 represents an integer of 0 to 4; nc represents an integer of 0 to 3; and * represents a bond incorporated in its main chain.

(9) The resin described in any one of the above items (1) to (8), wherein the resin has an acid value from 5 mg KOH/g to 25 mg KOH/g.

(10) The resin described in any one of the above items (1) to (9), wherein the resin has a weight average molecular weight from 7,000 to 70,000.

(11) An aqueous resin dispersion containing the resin described in any one of the above items (1) to (10) in an aqueous medium.

(12) A resin composition comprising the resin described in any one of the above items (1) to (10) and a crystalline resin.

(13) The resin composition described in the above item (12), wherein the crystalline resin is a crystalline polyester.
(14) A toner containing the resin described in any one of the above items (1) to (10), a crystalline resin, and a colorant.
(15) A method for producing a resin composition, the method including mixing the resin described in any one of the above items (1) to (10) and the other resin, each in an emulsified and dispersed state, and aggregating the resins.

Meanwhile, in the chemical formula, when there are a number of substituents or linking groups (hereinafter, referred to as substituents and the like) that are indicated with specific symbols, or when plural substituents and the like are defined simultaneously or alternatively, the respective substituents and the like maybe identical with or different from each other. This also similarly applies to the definition of the number of substituents and the like. Further, unless particularly stated otherwise, when plural substituents and the like are contiguous to each other, they may be connected to each other or condensed to form a ring.

Advantageous Effects of Invention

The resin and resin composition of the present invention can be imparted with environmental suitability by using plant-derived compounds. Further, since the resin and resin composition have good compatibility with crystalline resins, the resin and resin composition can be suitable as toner materials. Further, when the resin and resin composition are prepared into a toner, satisfactory performance such as fixability can be exhibited. Furthermore, according to the production method of the present invention, the resin composition described above can be suitably produced. In addition, since the toner of the present invention uses a resin having excellent properties as described above, the toner can exhibit excellent characteristics as a toner, and can provide advantages as a next-generation toner that is sufficiently capable of replacing resins of artificial origin, while conforming to the environment.

Other and further features and advantages of the present invention will appear more fully from the following description, appropriately referring to the accompanying drawings.

MODE FOR CARRYING OUT THE PRESENT INVENTION

Figure 1:
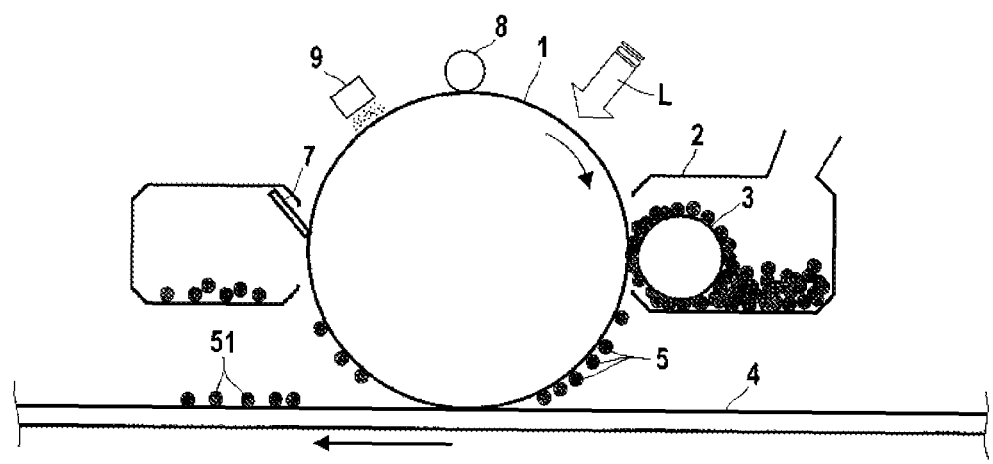
FIG. 1 is a side view schematically illustrating an apparatus in order to explain a copying machine based on electrophotography and the copying process thereof.

The resin of the present invention is formed of a particular polymer using a compound of plant origin, and has good properties as a resin for toner while being a plant-derived resin. The reason for this is speculated to be as follows. That is, the particular polymer has a structure originating from the dehydroabietic acid as its basic structure. It is considered that a structure in which this tricyclic moiety is two-dimensionally linked as a core is stable, and contributes to the stabilization of the characteristics of toner. On the other hand, since a linear component with rich flexibility (specifically an alkyl chain, an alkylene chain or the like) is incorporated as a copolymer component, the Tg that is too high for a toner has been improved. Furthermore, while it is speculated to be an effect caused by the parent nucleus of the tricyclic moiety and the particular aromatic ring, the resin of the present invention has good compatibility with crystalline resins and can suitably cope with a blend of resins when a toner is prepared. Hereinafter, preferred embodiments of the present invention will be mainly described in detail.

[Specific Polymer]
(Repeating Unit Containing Dehydroabietic Acid-Derived Structure)

The specific polymer, in the present invention, uses a dehydroabietic acid of the following formula (AA) or a derivative thereof as a raw material monomer. The specific polymer of the present invention may be a homopolymer obtained by polymerization of the raw material monomer or a copolymer obtained by polymerization of the raw material monomer and other monomers. Thus, the specific polymer includes, in its molecular structure, a repeating unit containing a dehydroabietic acid-derived structure.

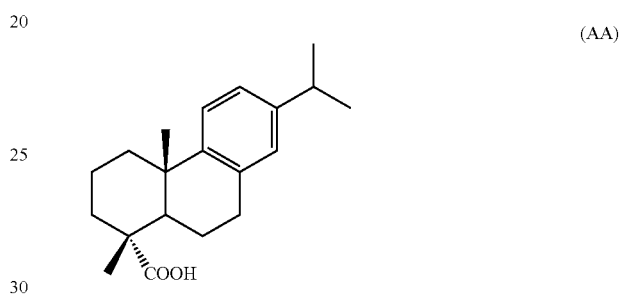

(AA)

In the present invention, the "dehydroabietic acid-derived structure" only needs to have a structure derived from the dehydroabietic acid shown above. In other words, the dehydroabietic acid-derived structure may be any structural structure capable of being derived from dehydroabietic acid so long as the desired effect can be achieved. Preferred examples of the structure are listed below.

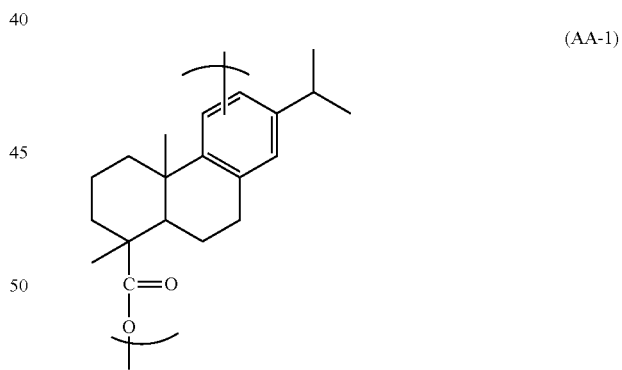

(AA-1)

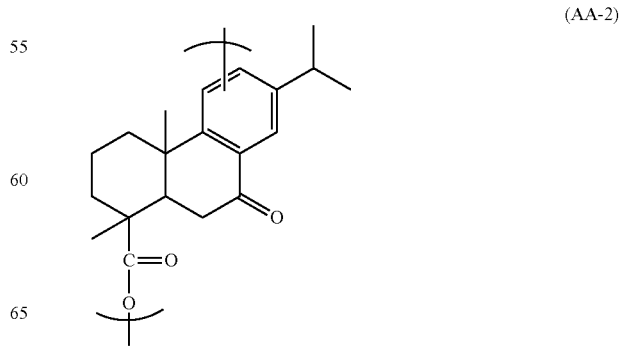

(AA-2)

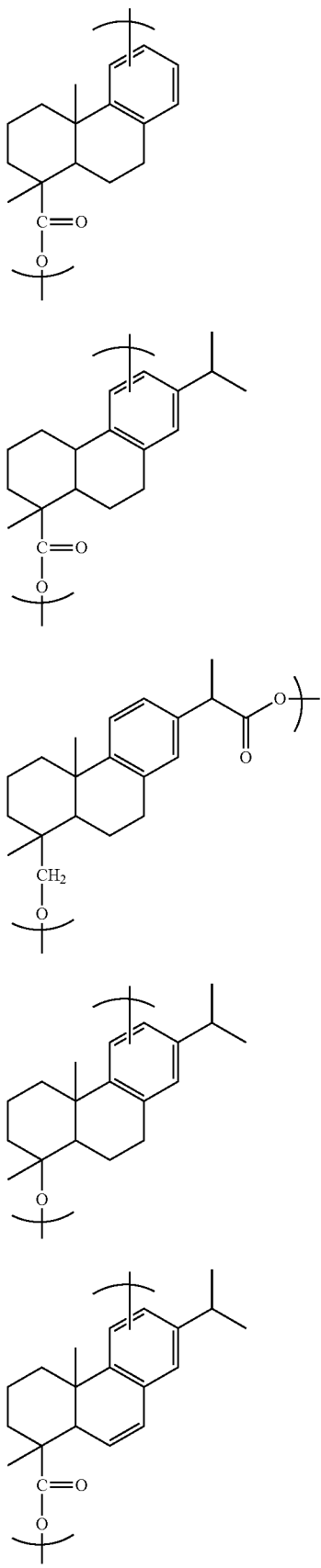
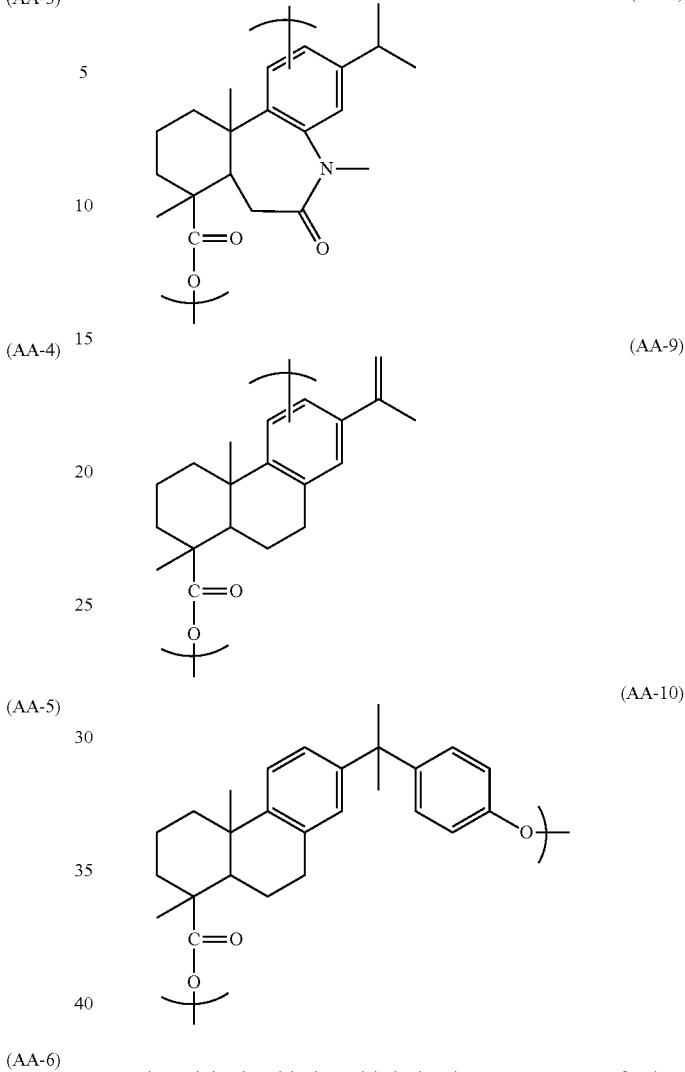

The "dehydroabietic acid-derived structure" may further have a substituent or substituents. Examples of substituents that may be introduced include an alkyl group, an alkoxy group, a halogen atom, a hydroxyl group, a carbonyl group, a nitro group, an amino group, etc.

(AA-1), (AA-3) or (AA-10) is preferable, and (AA-1) is most preferable.

When it comes to a preferable formula, in the specific polymer of the present invention, the dehydroabietic acid-derived structure preferably contains a structure represented by the following formula (U).

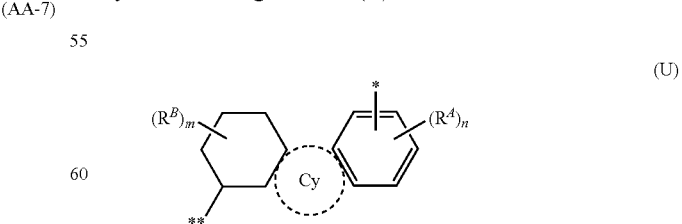

$R^A$ and $R^B$ represent an alkyl group having 1 to 6 carbon atom(s) or an alkenyl group having 1 to 6 carbon atom(s). n represents 0 to 3. m represents 0 to 5. Ring Cy represents a saturated or unsaturated six- or seven-membered ring optionally containing a heteroatom. In the formula, * and ** each represent a bond incorporated in its main chain. * may be a bond stretching from $R^A$. $R^B$ is preferably a methyl group. $R^A$ is preferably an alkyl group having 1 to 4 carbon atom(s), more preferably an i-propyl group. Cy is preferably a cyclohexane ring or a cyclohexene ring, more preferably a cyclohexane ring. n and m is preferably 1.

The above formula (U) is preferably the following formula (U1). $R^A$, $R^B$, m and n have the same meaning as those in formula (U). $R^C$ has the same meaning as that of $R^B$. p is an integer of 0 to 2, preferably 0.

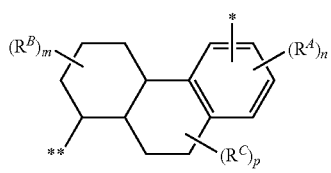

(U1)

Further, the above formula (U) is preferably the following formula (U2).

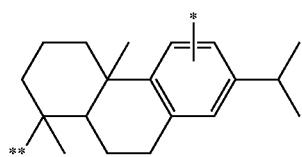

(U2)

In the formula, * and ** each represent a bond.

Dehydroabietic acid is one of the components constituting rosin which is contained in plant-derived pine resin. As this naturally-occurring material can be used as a base material, the amount of its carbon dioxide emission can be cancelled each other out. Accordingly, the equivalent volume of carbon dioxide emission can be significantly reduced as compared with the plastic materials produced from fossil fuel resources. Dehydroabietic acid is an environmentally-compatible, biomass resource-derived material which is expected to serve as the next generation materials. Hereinafter, the structures derived from dehydroabietic acid, such as the structures represented by formulae U, U1 and U2, are also collectively referred to as the dehydroabietane main structure, which is also abbreviated as "DHA main structure."

Further, as the important structures in preferred embodiments of the present invention, structures represented by the following formulae U3 and U4 are exemplified. The structure of formula U3 is referred to as the dehydroabietane structure (DA structure), and that of formula U4 is referred to as the dehydroabietic acid structure (DAA structure).

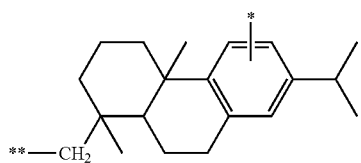

(U3)

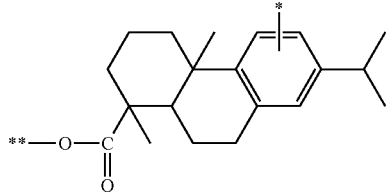

(U4)

The specific polymer is preferably selected from polymers containing a repeating unit represented by the following formula A01 or A02, more preferably from polymers containing a repeating unit represented by formula A11 or A12, even more preferably from polymers containing a repeating unit represented by formula A1 or A2. In the following formulae, $R^A$, $R^B$, $R^C$, m, n, p and Cy have the same meaning as those in formulae (U) and (U1).

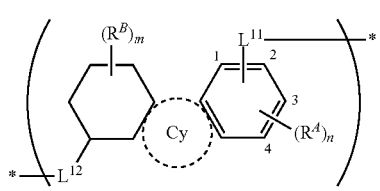

(A01)

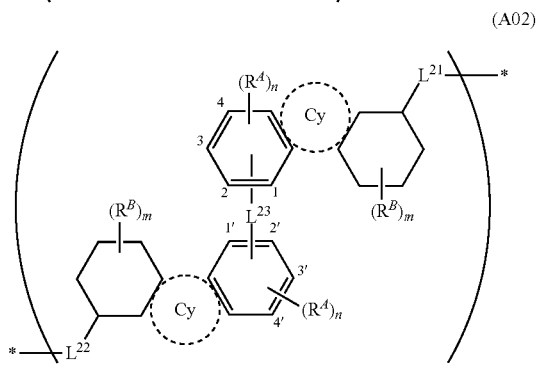

(A02)

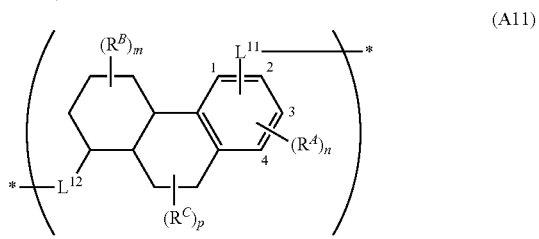

(A11)

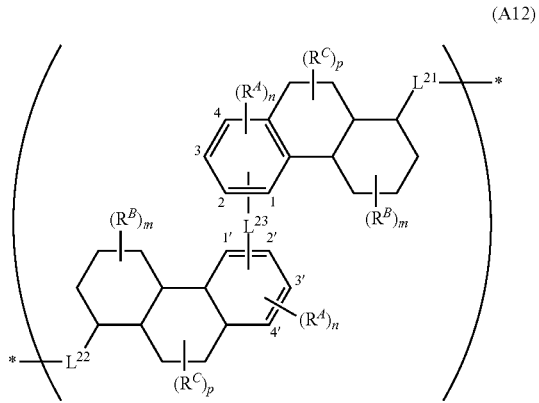

(A12)

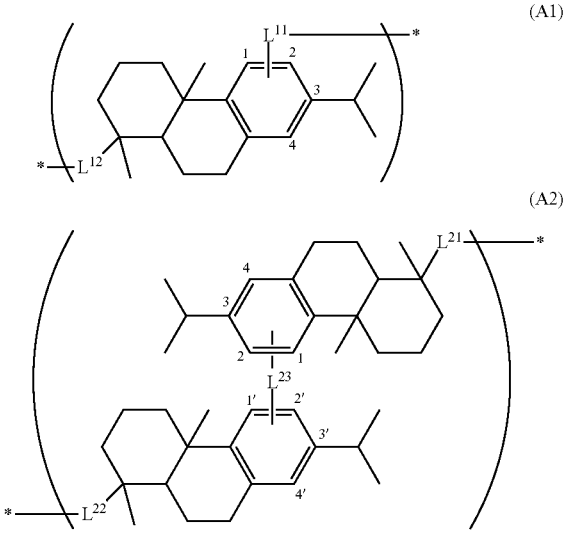

In the formulae, $L^{11}$, $L^{12}$, $L^{21}$, $L^{22}$ and $L^{23}$ represent a divalent linking group. * represents a bond. The preferred range of these linking groups will be shown in the following explanation of preferred embodiments of each polymer. A summary of preferred linking groups is shown as follows.

(1) Linking groups in the case where the repeating unit is derived from polycarboxylic acid $L^{11}$: *—CO-$L^{13}$-** or *-$L^{13}$-CO—** ($L^{13}$ represents a linking group. See the below explanation for the details.)

$L^{12}$, $L^{21}$, $L^{22}$: carbonyl group $L^{23}$: oxygen atom, sulfur atom, carbonyl group, sulfonyl group, alkylene group, alkenylene group, arylene group, or single bond (2) Linking groups in the case where the repeating unit is derived from polyol $L^{11}$: *-$L^{14}$-O—** ($L^{14}$ represents a linking group. See the below explanation for the details.)

$L^{12}$, $L^{21}$, $L^{22}$:*—$CH_2$—O—**

$L^{23}$: the same meaning as above

In formula A1, the linking group $L^{11}$ is preferably bonded to the carbon atom at position 2 shown in the formula. In formula A2, the linking group $L^{23}$ is preferably bonded to the carbon atoms at position 2 and position 2' shown in the formula.

Among the particular polymers described above, the proportion of the repeating unit having a dehydroabietic acid-derived structure is preferably 5% to 40%, and more preferably 10% to 30%, as a molar ratio, in the relationship with the copolymer components that will be described below. When this copolymerization ratio is equal to or greater than the lower limit, it is preferable because the amount of natural product-derived component in the resin can be increased, and when the copolymerization ratio is equal to or less than the upper limit, it is preferable because adequate flexibility can be imparted to the resin.

(Structural Unit of Formula (I))

The specific polymer in the present invention contains a structural unit represented by the following formula (I) as a copolymer component.

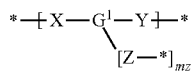

$G^1$ $G^1$ represents an alkylene group or alkenylene group having a total carbon number of 4 or greater. $G^1$ may be linear or branched, and may be unsubstituted or may have one or more hydrogen atoms substituted with particular substituents. Examples of substituents that may be introduced include the substituent T shown below. In particular, such a substituent is preferably an alkyl group or an alkenyl group. At least one carbon atom may be substituted by a heteroatom, examples of which include an oxygen atom, a nitrogen atom, and a sulfur atom. An oxygen atom is particularly preferred. Meanwhile, the total carbon number is meant to include, when the alkylene group or alkenylene group has a substituent, the number of carbon atoms of that substituent.

Among others, $G^1$ is preferably an alkylene group or alkenylene group which has a total carbon number of 4 to 18, and of which hydrogen atoms or oxygen atoms are substituted or unsubstituted. The total carbon number is more preferably 6 to 14. Specifically, preferred examples include —$(CH_2)_4$—, —$(CH_2)_5$—, —$(CH_2)_8$—, —$(CH_2)_{10}$—, —$(CHRa)CH_2$—, —$CH_2$—Rb—$CH_2$—, —$(CH_2CH_2O)_2$—$CH_2CH_2$—, and —$(CH_2CH_2O)_3$—$CH_2CH_2$—. Ra is preferably an alkyl group having 6 to 18 carbon atoms; and more preferably $C_{12}H_{23}$, or $C_8H_{15}$. Rb is preferably a cycloalkylene group having 4 to 12 carbon atoms, more preferably a cyclohexane diyl group.

X, Y, Z

X, Y, and Z each independently represent a divalent linking group selected from the group consisting of —O—, —S—, —NR—, —(C=O)—, —O(C=O)—, —(C=O)O—, —(C=O)NR—, and any combination thereof. They are each preferably —O—, —(C=O)O—, —(C=O)NH—, or —(C=O)—. Herein, R is a hydrogen atom, an alkyl group (preferably having 1 to 5 carbon atom(s)) or an alkenyl group (preferably having 1 to 5 carbon atom(s)).

mz represents an integer of 0 to 3.

Examples of the linking group that corresponds to formula (I) will be shown below, and the method for determining the number of carbon atoms will be described.

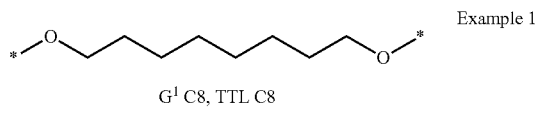

Example 1

$G^1$ C8, TTL C8
X = O  Y = O

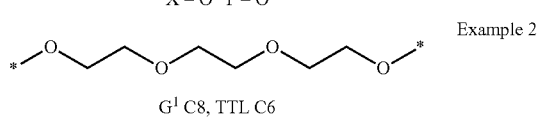

Example 2

$G^1$ C8, TTL C6
X = O  Y = O

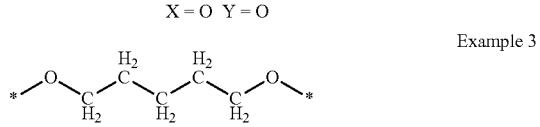

Example 3

$G^1$ C5, TTL C5
X = O  Y = O

-continued

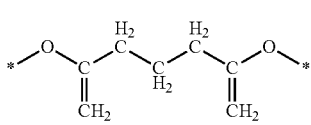

G¹ C5, TTL C7
X = O  Y = O

Example 4

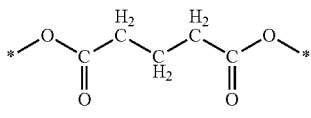

G¹ C5, TTL C5
X = O  Y = O

Example 5

* represents a bond. In example 2, G¹ is based on an octanediyl group, and two oxygen atoms replace the two carbon atoms. The total carbon number (TTL) of G¹ is 6. In example 4, the alkylene group serving as the base of G¹ is a pentanediyl group (C5). Two methylidene groups replace the alkylene group, and the total carbon number (TTL) is 7. In example 5, G¹ is based on a pentanediyl group, and two O= groups replace (add to) the pentanediyl group. The total carbon number (TTL) of G¹ is 5.

As described above, when G¹ contains a carbonyl group, its carbon atom is also included in the total carbon number, but it is preferable that the total carbon number of G¹ is 4 or greater without containing a carbonyl group.

Among the particular polymers described above, the copolymerization ratio of the repeating unit represented by formula (I) is preferably 10% to 80%, and more preferably 20% to 65%, as a molar ratio. When this copolymerization ratio is equal to or greater than the lower limit, it is preferable because adequate flexibility can be imparted to the resin, and also, compatibility with crystalline resins can be enhanced. When the copolymerization ratio is equal to or less than the upper limit, it is preferable because the melt viscosity and glass transition temperature of the resin can be maintained.

In the present invention, the particular polymer further contains a structural unit represented by the following formula (IIa) as a particular aromatic ring-containing structural unit.

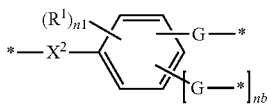

(IIa)

R¹

R¹ represents a substituent. Examples of such a substituent include the substituent T shown below. Among these, a monovalent organic group is preferable, and an alkyl group, an alkoxy group or an aryl group is more preferable. Meanwhile, when preferred examples in relation to the substituent T are indicated as such in the present specification, the preferred number of carbon atoms and the like are also the same as those of the substituent T.

X²

X² each independently represent a divalent linking group. Preferred examples are the same as those of X and Y of the above-described formula (I).

n1 n1 represents an integer of 0 to 4. nb represents an integer of 0 to 3.

G represents a divalent linking group, and is preferably a linking group containing G³ that will be described below or a linking group containing G⁵, and more preferably a linking group represented by the following formula (IIb).

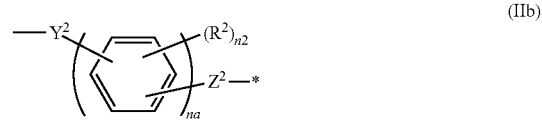

(IIb)

In formula, R², Z² and n2 have the same meaning as those of R¹, X¹ and n1, respectively. * represents the site of bond * of formula (IIa). na represents an integer of 0 to 3.

Y² represents a single bond or a divalent linking group composed of at least one selected from the group consisting of an oxygen atom, a carbonyl group, a sulfonyl group, and an alkylene group. When there are a plurality of Y², each Y² may be the same or different from each other.

The alkylene group constituting the divalent linking group in Y² may be a linear or branched chain alkylene group or a cyclic alkylene group. The number of carbon atoms in the alkylene group is preferably 1 to 6, more preferably 1 to 4. It should be noted that the number of carbon atoms in the alkylene group mentioned above does not include the carbon atoms in the substituent (side chain). Further, the alkylene group may further have a substituent such as a chain or cyclic alkyl group of 1 to 6 carbon atoms or an aryl group of 6 to 18 carbon atoms. The number of substituents on the alkylene group may be two or more. When the alkylene group has two or more substituents, these substituents may be the same or different and may be linked together to form a ring.

The structural unit of formula (IIa) is preferably a structural unit represented by the following formula (II).

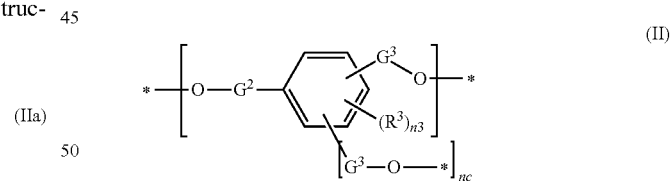

(II)

G² and G³

G² and G³ each represent a divalent linking group or a single bond. An alkylene group having 1 to 8 carbon atom(s), an alkenylene group or a single bond is preferable. G² and G³ may be linear or branched, and may contain a ring structure. When G² and G³ contain a ring structure, the ring structure may share some of the carbon atoms of the aromatic ring represented by formula (II), and one or more hydrogen atoms may be substituted or unsubstituted. Examples of substituents that may be introduced include the substituent T shown below. In particular, such a substituent is preferably an alkyl group, an alkenyl group, an aryl group or an alkoxy group. At least one carbon atom may be substituted by a heteroatom, examples of which include an oxygen atom, a nitrogen atom, and a sulfur atom. An oxygen atom is particularly preferred.

$R^3$ $R^3$ represents a substituent, and the preferred range of $R^3$ is the same as that of $R^1$. n3 represents an integer of 0 to 4. nc represents an integer of 0 to 3. * represents a bond incorporated in its main chain.

The structural unit of formula (IIa) may also be preferably a structural unit represented by the following formula (III).

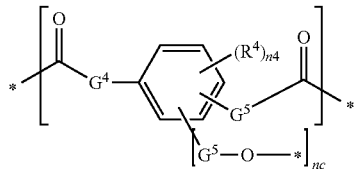

(III)

$G^4$ and $G^5$ each represent a divalent linking group. The preferred range of $G^4$ and $G^5$ are the same as those of $G^2$ or $G^3$. $R^4$ represents a substituent, and the preferred range of $R^4$ is the same as that of $R^1$. n4 represents an integer of 0 to 4. nc represents an integer of 0 to 3. * represents a bond incorporated in its main chain.

In the particular polymer described above, the repeating unit represented by formula (IIa) assumes a role of introducing an aromatic ring into the polymer. Therefore, the copolymerization ratio of the repeating unit (preferably, the total amount of the repeating unit represented by formula (II) and the repeating unit represented by formula (III)) is preferably 5% to 65%, and more preferably 10% to 50%, as a molar ratio. When this copolymerization ratio is in the range described above, it is preferable because an aromatic ring is appropriately introduced into the particular polymer, and compatibility with the crystalline resin can be enhanced.

The particular polymer may have another copolymer component, and the copolymerization ratio of the component is preferably suppressed to be 50% by mole or less. The lower limit is not particularly defined. Considering that there may be a case where other copolymer component is available, it is practical to adjust the lower limit to about 3% by mole. For example, propanediol and the like can be applied in a significant amount from the viewpoints of performance control and cost.

In regard to the resin of the present invention, the content percentage of the aromatic ring derived from the particular aromatic ring-containing structural unit is preferably from 5% by mass to 30% by mass, more preferably from 5% by mass to 25% by mass, and particularly preferably from 9% by mass to 18% by mass. When this ratio is set to be equal to or greater than the aforementioned lower limit, it is preferable because compatibility with crystalline resin can be enhanced. When this ratio is set to be equal to or less than the aforementioned upper limit, it is preferable because the content percentage of natural product-derived component can be relatively increased.

Meanwhile, the content percentage of the aromatic ring can be specified by the method described in Examples that will be described below.

(Molecular Weight)

The type of bonding of the specific polymer in the present invention is not particularly limited so long as the polymer contains the DHA main structure so as to constitute part of the main chain of the specific polymer. The weight average molecular weight of the specific polymer is preferably, but not limited to, 7,000 to 700,000, more preferably 9,000 to 500,000. When the weight average molecular weight is in this range, the melt viscosity, glass transition temperature, flexibility and the like that are suitable particularly as a resin for toner are realized and become satisfactory. In the present invention, the weight average molecular weight is a value obtained by gel permeation chromatography (GPC) molecular weight determination (polystyrene-converted molecular weight). Unless otherwise specified in the present description, the molecular weight is a value determined using tetrahydrofuran as a carrier and a TSK-gel Super AWM-H (trade name) column manufactured by TOSOH CORPORATION as a column.

(Tg)

The glass transition temperature (Tg) is preferably, but not limited to, 30° C. or higher, more preferably 40 to 80° C., even more preferably 45 to 65° C. When the glass transition temperature is in this range, the particular polymer can achieve a balance between fixability and thermal stability over time particularly in the case where the polymer is used as a toner. Meanwhile, unless otherwise particularly specified, the glass transition temperature is based on the method and conditions employed in the Examples described below.

The specific polymer may also include a derivative produced by performing a chemical treatment or other processes on the polymer having the DHA main structure-containing repeating unit.

In the present invention, the particular polymer is preferably a copolymer having a polyester structure in which the DHA main structure is derived from a dicarboxylic acid thereof (particular polymer (1)), or a copolymer having a polyester structure in which the DHA main structure is derived from a diol thereof (particular polymer (2)). Hereinafter, the respective embodiments will be described.

[Specific Polymer [I]]

<Dicarboxylic Acid Compound-Derived Repeating Unit>

~Repeating Unit Represented by Formula A1~

$L^{11}$

In formula A1 et al., $L^{11}$ is preferably *—CO-$L^{13}$-** or *-$L^{13}$-CO—**. * represents the bond on the 5,6,7,8,9,10-hexahydrophenanthrene ring (mother nucleus) side, and ** represents the bond opposite thereto.

$L^{13}$ $L^{13}$ is preferably an alkylene group, an alkenylene group, an alkynylene group, an arylene group, an oxygen atom, a carbonyl group, a single bond or any combination thereof.

The alkylene group and the alkenylene group may be a linear or branched chain or may be cyclic. In view of heat resistance, $L^{13}$ is preferably an alkylene group of 2 to 10 carbon atoms, an alkenylene group of 2 to 10 carbon atoms, an arylene group of 6 to 18 carbon atoms, an oxygen atom, a carbonyl group, a single bond, or any combination thereof. $L^{13}$ is more preferably a chain alkylene or carbonyl alkylene group of 2 to 4 carbon atoms, a cyclic alkylene or carbonyl alkylene group of 5 to 6 carbon atoms, a chain alkenylene or carbonyl alkenylene group of 2 to 4 carbon atoms, a cyclic alkenylene or carbonyl alkenylene group of 5 to 6 carbon atoms, an arylene or carbonyl arylene group of 6 to 10 carbon atoms, an oxygen atom, or a single bond.

In the present description, when the name of a molecule is called by putting the term "compound" at the foot of the molecule or the name is shown by a specific name or chemical formula, a showing of the molecule is used to mean not only the molecule itself, but also a salt, a complex or ion thereof and the like. Further, the showing thereof is also used to mean incorporation of derivatives modified by a predefined configuration to an extent necessary to obtain a desired effect. Furthermore, in regard to a substituent that is not specified to be substituted or unsubstituted in the present invention, this means that the group may have an optional substituent. This also similarly applies to a compound that is not specified to be substituted or unsubstituted. Examples of preferred substituent include those of the substituent T shown below.

The subsutituent T includes the following subsutituents.

The subsutituents include an alkyl group (preferably an alkyl group having 1 to 20 carbon atom(s), for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, for example, vinyl, allyl, and oleyl), an alkynyl group (preferably an alkynyl group having 2 to 20 carbon atoms, for example, ethynyl, butadiynyl, and phenylethynyl), a cycloalkyl group (preferably a cycloalkyl group having 3 to 20 carbon atoms, for example, cyclopropyl, cyclopentyl, cyclohexyl, and 4-methylcyclohexyl), an aryl group (preferably an aryl group having 6 to 26 carbon atoms, for example, phenyl, 1-naphthyl, 4-methoxyphenyl, 2-chlorophenyl, and 3-methylphenyl), a heterocyclic group (preferably a heterocyclic group having 2 to 20 carbon atoms, for example, 2-pyridyl, 4-pyridyl, 2-imidazolyl, 2-benzimidazolyl, 2-thiazolyl, and 2-oxazolyl), an alkoxy group (preferably an alkoxy group having 1 to 20 carbon atom(s), for example, methoxy, ethoxy, isopropyloxy, and benzyloxy), an aryloxy group (preferably an aryloxy group having 6 to 26 carbon atoms, for example, phenoxy, 1-naphthyloxy, 3-methylphenoxy, and 4-methoxyphenoxy), an alkoxycarbonyl group (preferably an alkoxycarbonyl group having 2 to 20 carbon atoms, for example, ethoxycarbonyl and 2-ethylhexyloxycarbonyl), an amino group (preferably an amino group having 0 to 20 carbon atom(s), for example, amino, N,N-dimethylamino, N,N-diethylamino, N-ethylamino, and anilino), a sulfonamide group (preferably a sulfonamide group having 0 to 20 carbon atom(s), for example, N,N-dimethylsulfonamide, and N-phenylsulfonamide), an acyloxy group (preferably an acyloxy group having 1 to 20 carbon atom(s), for example, acetyloxy and benzoyloxy), a carbamoyl group (preferably a carbamoyl group having 1 to 20 carbon atom(s), for example, N,N-dimethylcarbamoyl and N-phenylcarbamoyl), an acylamino group (preferably an acylamino group having 1 to 20 carbon atom(s), for example, acetylamino and benzoylamino), a cyano group and a halogen atom (for example, a fluorine atom, a chlorine atom, a bromine atom, and an iodine atom). Among them, an alkyl group, an alkenyl group, an aryl group, a heterocyclic group, an alkoxy group, an aryloxy group, an alkoxycarbonyl group, an amino group, an acylamino group, a cyano group, and a halogen atom are more preferable. An alkyl group, an alkenyl group, a heterocyclic group, an alkoxy group, an alkoxycarbonyl group, an amino group, an acylamino group, and a cyano group are particularly preferable.

Specific examples of the linking group represented by $L^{13}$ are shown in the followings, but the present invention is not limited thereto. In the chemical structural formulae illustrated below, * represents a bond to the hydrophenanthrene ring, and ** represents a bond opposite thereto.

(L1-ex-1)

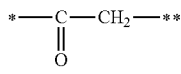
(L1-ex-2)

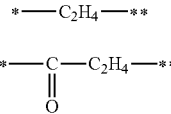
(L1-ex-3)

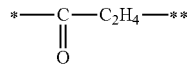
(L1-ex-4)

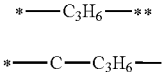
(L1-ex-5)

(L1-ex-6)

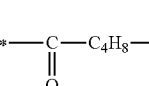
(L1-ex-7)

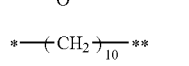
(L1-ex-8)

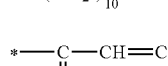
(L1-ex-9)

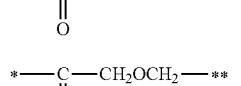
(L1-ex-10)

(L1-ex-11)

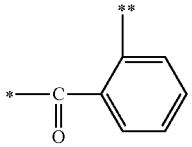
(L1-ex-12)

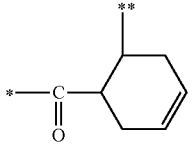
(L1-ex-13)

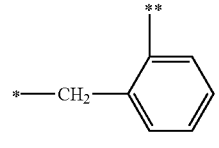
(L1-ex-14)

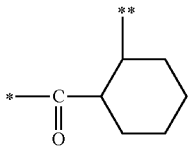
(L1-ex-15)

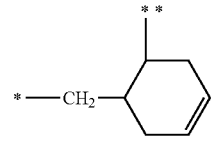
(L1-ex-16)

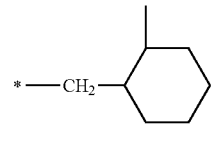
(L1-ex-17)

$L^{13}$ in formula (A1) is preferably a single bond, (L1-ex-4), (L1-ex-10) or (L1-ex-12), and more preferably a single bond, from the viewpoints of various properties when the polymer is used in the resin, and ease of synthesis. Even more preferably, $L^{11}$ is *—CO—**, *—CO—**, or *—CO-Rd-COO—** wherein Rd represents an alkylene group having 1 to 6 carbon atoms.

In formula A1 et al., the linking group $L^{11}$ may be bonded to the carbon atom at any one of positions 1, 2, and 4, but is preferably bonded to the carbon atom at position 2 or 4, more preferably to the carbon atom at position 2. This applies to a specific polymer (2) described below.

$L^{12}$ $L^{12}$ is preferably a carbonyl group

In another preferred mode, the specific polymer (1) contains a dimer structure as part of its main chain in its repeating unit, in which the dimer structure has two dehydroabietane main structures bonded directly or through a linking group. The repeating unit containing the dimer structure is represented, for example, by formula (A2) above.

~Repeating Unit Represented by Formula A2~

$L^{21}$ and $L^{22}$

In formula A2 et al., $L^{21}$ and $L^{22}$ are preferably a carbonyl group or a carbonyloxy group.

$L^{23}$ $L^{23}$ is preferably an oxygen atom, a sulfur atom, a carbonyl group, a sulfonyl group, an alkylene group, an alkenylene group, an arylene group or a single bond. The alkylene group and the alkenylene group may be a linear or branched chain or may be cyclic. From the viewpoints of various properties when the polymer is used in the resin, and ease of synthesis, the linking group represented by $L^{23}$ preferably includes at least one selected from the group consisting of an oxygen atom, a sulfur atom, a carbonyl group, a sulfonyl group, an alkylene group of 2 to 10 carbon atoms, an alkenylene group of 2 to 10 carbon atoms, and an arylene group of 6 to 18 carbon atoms, and is more preferably a single bond or a divalent linking group including at least one selected from the group consisting of an oxygen atom, a sulfur atom, a carbonyl group, a sulfonyl group, a chain alkylene group of 1 to 4 carbon atoms, a cyclic alkylene group of 5 to 6 carbon atoms, a chain alkenylene group of 2 to 4 carbon atoms, a cyclic alkenylene group of 5 to 6 carbon atoms, and an arylene group of 6 to 8 carbon atoms.

When possible, the alkylene group, the alkenylene group, and the arylene group as a component of the linking group represented by $L^{23}$ may have a substituent. Examples of such a substituent on the alkylene group, the alkenylene group, and the arylene group include those of the substituent T described above. Examples of the linking group represented by $L^{23}$ include the following linking groups, which however are not intended to limit the invention.

—O—  (L2-ex-1)

—CH$_2$—  (L2-ex-2)

—S—  (L2-ex-3)

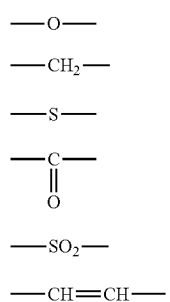  (L2-ex-4)

—SO$_2$—  (L2-ex-5)

—CH=CH—  (L2-ex-6)

—CH$_2$CH$_2$—  (L2-ex-7)

—SCH$_2$CH$_2$S—  (L2-ex-8)

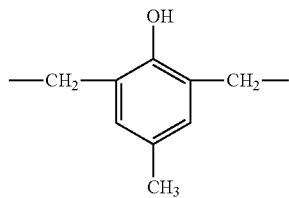  (L2-ex-9)

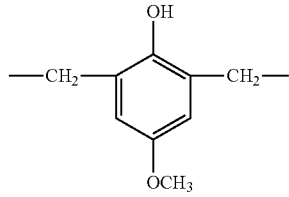  (L2-ex-10)

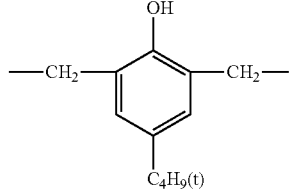  (L2-ex-11)

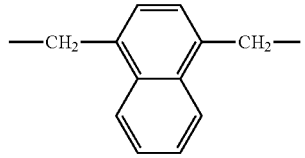  (L2-ex-12)

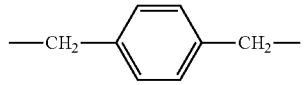  (L2-ex-13)

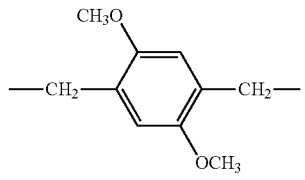  (L2-ex-14)

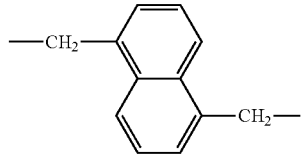  (L2-ex-15)

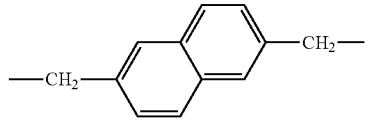  (L2-ex-16)

From the viewpoints of various properties when the polymer is used in the resin, and ease of synthesis, $L^{23}$ is preferably (L2-ex-2), (L2-ex-5), (L2-ex-9) or (L2-ex-11), more preferably (L2-ex-2).

In formula A2 et al., the linking group $L^{23}$ may be bonded to any carbon atom of the 1-position, 2-position, 4-position, 1'-position, 2'-position and 4'-position in the formulae. However, it is preferable that $L^{23}$ is bonded to the carbon atoms shown at the 2-position, 4-position, 2'-position and 4'-position (provided that it is a combination of linking two hydrophenanthrene rings), and it is more preferable that the linking group $L^{23}$ is bonded to the carbon atoms shown at the 2-position and the 2'-position. Meanwhile, these bonding positions also similarly apply to the particular polymer (2) that will be described below.

In the present embodiment, it is preferable that the copolymerization ratio of the repeating unit formed from the DHA main structure is in the range described above.

(Method for Production of the Specific Polymer (1))

Dehydroabietic acid for use in the production of the specific polymer (1) of the embodiment can be obtained, for example, from rosin. The constituents contained in the rosin vary with how to obtain rosin and where pine trees as sources of rosin are located. Rosin is a mixture of diterpene-based resin acids such as (1) abietic acid, (2) neoabietic acid, (3) palustric acid, (4) levopimaric acid, (5) dehydroabietic acid, (6) pimaric acid, (7) isopimaric acid. Among these deterrence-based resin acids, the compounds (1) to (4) can be each disproportionated by a heat treatment in the presence of a certain type of metal catalyst, so they can be turned into dehydroabietic acid (5) and dihydroabietic acid (8) of the structure shown below. That is, dehydroabietic acid (5) necessary for the production of the specific polymer (1) of the present invention can be obtained with relative ease by subjecting the rosin, a mixture of various resin acids, to appropriate chemical processing. It can also be industrially produced at low cost. Dihydroabietic acid (8) and dehydroabietic acid (5) can be easily separated from each other by known methods.

(1)

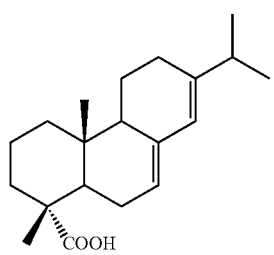

(2)

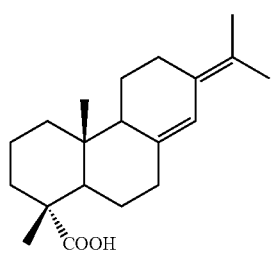

(3)

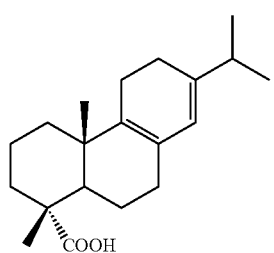

(4)

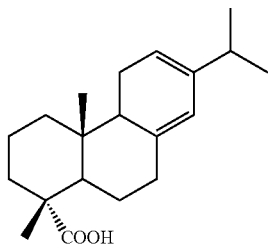

(5)

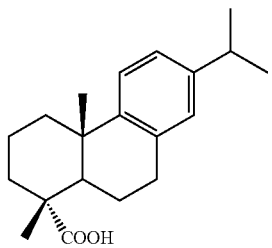

(6)

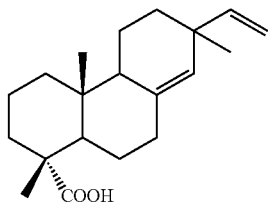

(7)

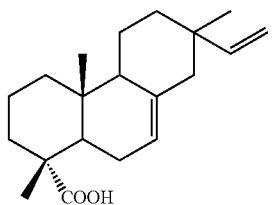

(8)

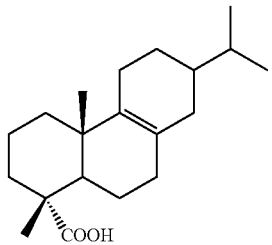

For example, the specific polymer (1) having the repeating unit of formula (A1) or (A2) and the repeating unit of formula (I) can be synthesized by a process that includes performing polycondensation of a polyol compound forming the repeating unit of formula (I) and a dicarboxylic acid compound forming the repeating unit of formula (A1) or (A2) or a derivative thereof, such as a dicarboxylic acid halide derivative or a diester derivative, using a known method.

Examples of methods for synthesizing the polymer include methods described in Shin Kobunshi Jikken-gaku 3 (New Polymer Experimentation 3), Kobunshi no Gosei Hanno (2) (Polymer Synthesis/Reaction (2)), pages 78-95, KYORITSU SHUPPAN CO., LTD. (1996) (such as transesterification, direct esterification, melt polymerization such as acid halide method, low-temperature solution polymerization, high-temperature solution polymerization, and interfacial polycondensation). In the present invention, use of transesterification and direct esterification is particularly preferred, from the viewpoints that it is possible to reduce the manufacturing cost.

A transesterification method is a method for synthesizing the specific polymer (1) by subjecting a polyol compound and a polycarboxylic acid ester derivative in a melt state or a solution state to dealcoholization polycondensation with heating optionally in the presence of a catalyst.

A direct esterification method is a method for synthesizing the specific polymer (1) by subjecting a polyol compound and a polycarboxylic acid compound in a melt state or a solution state to dehydration polycondensation with heating in the presence of a catalyst.

An acid halide method is a method for synthesizing the specific polymer (1) by subjecting a polyol compound and a polycarboxylic acid halide derivative in a melt state or a solution state to dehydrohalogenation polycondensation with heating optionally in the presence of a catalyst.

An interfacial polymerization method is a method for synthesizing the specific polymer (1) by dissolving a polyol compound in water, and aside from this, dissolving a polycarboxylic acid compound or a derivative thereof in an organic solvent followed by subjecting them to polycondensation at the interface between the water and the organic solvent using a phase transfer catalyst.

A dimer of dehydroabietic acid (DAA) of formula (A2) can be synthesized by the method described in JP-A-2011-26569. Specifically, when $L^{23}$ is linked through a single bond, the reaction can be allowed to proceed using oxalyl chloride in the presence of a catalytic amount of N, N-dimethylformamide. When $L^{23}$ is a methylene group, dichloromethane may be used instead of oxalyl chloride in the above method. Alternatively, as shown in the synthesis examples below, the reaction may be allowed to proceed by a process that includes mixing DAA with formalin and adding a catalytic amount of trifluoroacetic acid.

In the present embodiment, it is preferable to use, apart from the DHA main structure, the following dicarboxylic acid compound (formula I-1) or diol compound (formula I-2) as the monomer that constitute the structural unit represented by formula (I). Meanwhile, diols and dicarboxylic acids are taken as examples herein, but as described above, these may also be polyols or polycarboxylic acids.

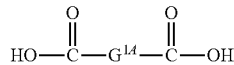

(I-1)

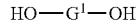

(I-2)

In formula, $G^{1A}$ has the same meaning as $G^1$ of formula (I). $G^{1A}$ in the formula means a linking group that constitutes a portion of $G^1$, and in the present embodiment, $G^{1A}$ and $G^1$ may be considered to be the same, or it may be considered that —CO-$G^{1A}$-CO— corresponds to $G^1$.

Furthermore, the same also applies to the formulae (II) and (III), and it is preferable to use monomers of the following formulae (II-1) and (III-1) corresponding to those.

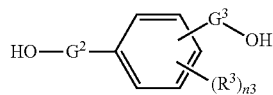

(II-1)

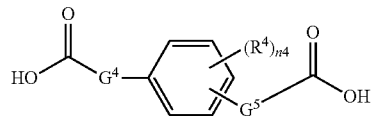

(III-1)

In formulae, $G^2$ to $G^5$, $R^3$, $R^4$, n3 and n4 have the same meaning as those of formula (II) or (III).

Regarding the monomers of the various formulae described above, one kind may be used for each, or two or more kinds may be used. The use ratio of the various monomers is preferably set to be in the range of copolymerization ratio described above in connection with the particular polymer.

The specific polymer (1) of the embodiment may be a copolymer produced with an additional polycarboxylic acid compound. As the additional polycarboxylic acid compound, a polycarboxylic acid compound commonly used to constitute the polyester-type polymer [I] may be used without limitation. For example, the polycarboxylic acid compounds shown in Gosei Kobunshi (Synthetic Polymers) V (Asakura Publishing Co., Ltd.), pages 63-91, may be used.

Examples of the additional polycarboxylic acid compound include aromatic dicarboxylic acids such as terephthalic acid, isophthalic acid, and naphthalenedicarboxylic acid; and aliphatic dicarboxylic acids such as cyclohexanedicarboxylic acid, dicyclohexanedicarboxylic acid, and adipic acid.

Examples of the other polyol compound include polyols having cyclic structures and polyols that do not have cyclic structures. The ring structure contained in the polyol compound may be an aliphatic ring, an aromatic ring, a hydrocarbon ring, or a heterocyclic ring. The aliphatic ring may also have an unsaturated bond. Furthermore, there are no particular limitations on the number of rings contained in the polyol compound. For example, the number of rings can be adjusted to 1 to 5, and from the viewpoints of various properties when the polymer is used in the resin, and availability. The number of rings is preferably 1 to 3, and more preferably 1 to 2. When the polyol compound has two or more rings, two or more monocycles may be covalently bonded or linked through a linking group to form a ring structure, or two or more rings may form a condensed ring structure.

Examples of the repeating unit derived from the ring structure-containing polyol compound include repeating units derived from cyclohexanediol, cyclohexanedimethanol, 1,4-bis(2-hydroxyethoxy)benzene, 1,4-bis(2-hydroxypropoxy)benzene, and 4-hydroxyethyl phenol. As the additional polyol compound with no ring structure, a commonly-used polyol compound to constitute the specific polymer (1) may be used without limitation. Examples of such a polyol compound include ethylene glycol, 1,2-propanediol, 1,3-propanediol, 1,4-butanediol, 1,6-hexanediol, 1,8-octanediol, 1,10-decanediol, 1,12-dodecanediol, diethylene glycol, triethylene glycol, tetraethylene glycol, and other diol compounds.

[Specific Polymer (2)]

In the present embodiment, it is preferable that the DHA main structure is derived from a diol compound, and the linking groups are respectively as follows.

$L^{11}$ $L^{11}$ is a single bond or *-$L^{1A}$-O—**. * represents a bond to the hydrophenanthrene ring side, and ** represents a bond opposite thereto. $L^{1A}$ represents a single bond or a divalent linking group. Examples of the divalent linking group include, but are not limited to, —($C_nH_{2n}$)—, —CO($C_nH_{2n}$)—, and similar structures, wherein n is an integer of 1 to 12, preferably 1 to 8. They may be a linear or branched chain or cyclic and may further have a substituent. In addition, at least one of the carbon atoms constituting the molecular chain may be substituted by an oxygen atom. When an oxygen atom is bonded to $L^{1A}$, $L^{1A}$ is preferably —(CH$_2$)$_4$—, —(CH$_2$)$_5$—, or —(CH$_2$)$_6$—. When a carbonyl group is bonded to $L^{1A}$, $L^{1A}$ is preferably —(CH$_2$)$_3$—, —(CH$_2$)$_4$—, —(CH$_2$)$_5$—, —CO(CH$_2$)$_2$—, —CO(CH$_2$)$_3$—, or —CO(CH$_2$)$_4$—.

$L^{12}$, $L^{21}$ and $L^{22}$ $L^{12}$ is *—CH$_2$—O—**. * represents a bond to the hydrophenanthrene ring side, and ** represents a bond opposite thereto.

$L^{23}$ $L^{23}$ has the same meaning as the above, and the preferred range is also the same as the above.

(Method for Production of the Specific Polymer (2))

Synthesis of a dicarboxylic acid form of dehydroabietic acid can be carried out in the same manner as in the case of the particular polymer (1). The dicarboxy compound is produced by introducing a carboxy group into abietic acid. The reaction from the dicarboxy compound to a dialkoxy compound may be a common reduction reaction. For example, the reduction reaction can be allowed to proceed quickly by reduction with aluminum hydride. The reaction for obtaining a polyester from a dialkoxy compound by a reaction with a polycarboxylic acid chloride compound may be carried out by a standard method.

The process of allowing the dialkoxy compound to react with terephthalic acid dichloride is the same as that described above in relation to the particular polymer (1). In addition to that, it is still acceptable to allow the dicarboxylic acid to react so as to progress an esterification reaction, or to carry out a transesterification reaction. For those reactions, the same reactions as those described above in relation to the particular polymer (1) may also be used.

The other polycarboxylic acid compound or polyol compound that is combined with the polyol compound having a DHA main structure is the same as the compounds described above in relation to the particular polymer (1). Specifically, compounds represented by formulae (I-1), (I-2), (II-1) and (III-1) can be preferably used. The monomers that constitute the other copolymer component may also be used.

JP-A-2011-026569 can be referred to for details on the compounds and methods for the production of the specific polymer (1). JP-A-2011-074249 can be referred to for details on the compounds and methods for the production of the specific polymer (2).

Specific examples of the specific polymer of the present invention are shown below, but the present invention is not intended to be limited thereto.

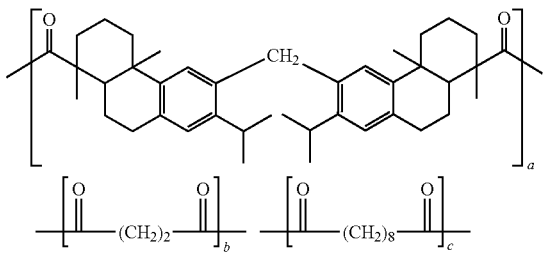

TABLE A1

| | Polyvalent carboxylic acid | | | | | | | | | Polyhydric alcohol | | | | | | | Others |
|---|---|---|---|---|---|---|---|---|---|---|---|---|---|---|---|---|---|
| | formula (A) | | formula (I) | | | | formula (III) | | | formula (II) | | | | formula (I) | | | |
| | a | w | b | c | d | u | e | f | s | t | g | h | i | k | r | n | p | q | m |
| P-1 | 29 | 0 | 0 | 19 | 0 | 0 | 0 | 0 | 3 | 0 | 48 | 0 | 0 | 0 | 0 | 0 | 0 | 0 | 0 |
| P-2 | 24 | 0 | 0 | 9 | 14 | 6 | 0 | 0 | 0 | 0 | 47 | 0 | 0 | 0 | 0 | 0 | 0 | 0 | 0 |
| P-3 | 24 | 0 | 0 | 14 | 10 | 0 | 0 | 0 | 5 | 0 | 48 | 0 | 0 | 0 | 0 | 0 | 0 | 0 | 0 |
| P-4 | 29 | 0 | 0 | 19 | 0 | 0 | 0 | 0 | 3 | 0 | 36 | 0 | 0 | 0 | 0 | 12 | 0 | 0 | 0 |
| P-5 | 22 | 0 | 0 | 11 | 0 | 0 | 14 | 0 | 0 | 6 | 14 | 0 | 0 | 0 | 0 | 33 | 0 | 0 | 0 |
| P-6 | 21 | 0 | 0 | 11 | 0 | 9 | 14 | 0 | 0 | 0 | 14 | 0 | 0 | 0 | 0 | 23 | 0 | 9 | 0 |
| P-7 | 23 | 0 | 0 | 7 | 9 | 0 | 10 | 0 | 3 | 0 | 24 | 0 | 0 | 0 | 0 | 24 | 0 | 0 | 0 |
| P-8 | 25 | 0 | 0 | 6 | 7 | 0 | 10 | 0 | 5 | 0 | 24 | 0 | 0 | 0 | 0 | 24 | 0 | 0 | 0 |
| P-9 | 22 | 0 | 0 | 7 | 6 | 0 | 12 | 0 | 5 | 0 | 19 | 0 | 0 | 0 | 0 | 24 | 0 | 5 | 0 |
| P-10 | 29 | 0 | 0 | 19 | 0 | 0 | 0 | 0 | 3 | 0 | 39 | 0 | 0 | 0 | 0 | 0 | 0 | 10 | 0 |
| P-11 | 30 | 0 | 0 | 16 | 0 | 0 | 0 | 0 | 0 | 7 | 19 | 0 | 0 | 0 | 0 | 0 | 0 | 28 | 0 |
| P-12 | 24 | 0 | 0 | 24 | 0 | 0 | 0 | 0 | 3 | 0 | 24 | 0 | 0 | 0 | 0 | 0 | 0 | 0 | 24 |
| P-13 | 24 | 0 | 0 | 14 | 10 | 0 | 0 | 0 | 3 | 0 | 0 | 48 | 0 | 0 | 0 | 0 | 0 | 0 | 0 |
| P-14 | 24 | 0 | 0 | 14 | 10 | 0 | 0 | 0 | 3 | 0 | 0 | 0 | 48 | 0 | 0 | 0 | 0 | 0 | 0 |
| P-15 | 14 | 0 | 0 | 14 | 0 | 0 | 19 | 0 | 3 | 0 | 0 | 0 | 0 | 0 | 0 | 0 | 0 | 0 | 48 |
| P-16 | 9 | 0 | 0 | 12 | 0 | 0 | 26 | 0 | 6 | 0 | 0 | 0 | 0 | 0 | 0 | 0 | 0 | 0 | 47 |
| P-17 | 23 | 0 | 0 | 9 | 0 | 8 | 14 | 0 | 0 | 0 | 0 | 0 | 0 | 0 | 0 | 0 | 0 | 18 | 28 |
| P-18 | 19 | 0 | 0 | 15 | 0 | 0 | 15 | 0 | 3 | 0 | 0 | 0 | 0 | 10 | 0 | 0 | 0 | 0 | 39 |
| P-19 | 19 | 0 | 0 | 14 | 0 | 0 | 14 | 0 | 4 | 0 | 0 | 0 | 0 | 19 | 0 | 0 | 0 | 0 | 29 |
| P-20 | 19 | 0 | 0 | 17 | 0 | 0 | 12 | 0 | 3 | 0 | 0 | 0 | 0 | 19 | 0 | 0 | 0 | 0 | 29 |

TABLE A2

| | Polyvalent carboxylic acid | | | | | | | | | Polyhydric alcohol | | | | | | | Others |
|---|---|---|---|---|---|---|---|---|---|---|---|---|---|---|---|---|---|
| | formula (A) | | formula (I) | | | | formula (III) | | | formula (II) | | | | formula (I) | | | |
| | a | w | b | c | d | u | e | f | s | t | g | h | i | k | r | n | p | q | m |
| P-21 | 17 | 0 | 0 | 0 | 19 | 0 | 12 | 0 | 3 | 0 | 0 | 0 | 0 | 19 | 0 | 0 | 0 | 0 | 29 |
| P-22 | 19 | 0 | 0 | 7 | 10 | 0 | 12 | 0 | 0 | 4 | 0 | 0 | 0 | 19 | 0 | 0 | 0 | 0 | 29 |
| P-23 | 20 | 0 | 0 | 18 | 0 | 0 | 0 | 11 | 3 | 0 | 0 | 0 | 0 | 19 | 0 | 0 | 0 | 0 | 29 |
| P-24 | 19 | 0 | 0 | 17 | 0 | 0 | 12 | 0 | 3 | 0 | 0 | 0 | 0 | 0 | 19 | 0 | 0 | 0 | 29 |
| P-25 | 15 | 0 | 20 | 0 | 0 | 0 | 13 | 0 | 3 | 0 | 0 | 0 | 0 | 16 | 0 | 0 | 0 | 0 | 32 |
| P-26 | 18 | 0 | 16 | 5 | 0 | 0 | 9 | 0 | 5 | 0 | 0 | 0 | 0 | 19 | 0 | 0 | 0 | 0 | 28 |
| P-27 | 22 | 0 | 0 | 17 | 0 | 0 | 10 | 0 | 3 | 0 | 0 | 0 | 0 | 0 | 0 | 0 | 19 | 0 | 29 |
| P-28 | 36 | 0 | 0 | 0 | 12 | 0 | 0 | 0 | 5 | 0 | 7 | 0 | 0 | 0 | 0 | 0 | 0 | 40 | 0 |
| P-29 | 14 | 0 | 0 | 14 | 0 | 0 | 19 | 0 | 5 | 0 | 48 | 0 | 0 | 0 | 0 | 0 | 0 | 0 | 0 |
| P-30 | 25 | 0 | 0 | 6 | 3 | 0 | 10 | 0 | 2 | 0 | 24 | 0 | 0 | 0 | 0 | 24 | 0 | 0 | 0 |
| P-31 | 25 | 0 | 0 | 6 | 7 | 0 | 10 | 0 | 9 | 0 | 24 | 0 | 0 | 0 | 0 | 24 | 0 | 0 | 0 |
| P-30 | 25 | 0 | 0 | 6 | 3 | 0 | 10 | 0 | 2 | 0 | 24 | 0 | 0 | 0 | 0 | 24 | 0 | 0 | 0 |
| P-31 | 25 | 0 | 0 | 6 | 7 | 0 | 10 | 0 | 9 | 0 | 24 | 0 | 0 | 0 | 0 | 24 | 0 | 0 | 0 |
| P-32 | 0 | 39 | 0 | 0 | 5 | 0 | 5 | 0 | 3 | 0 | 24 | 0 | 0 | 0 | 0 | 24 | 0 | 0 | 0 |
| P-33 | 0 | 29 | 0 | 10 | 0 | 0 | 10 | 0 | 3 | 0 | 0 | 0 | 0 | 15 | 0 | 0 | 0 | 0 | 34 |

Meanwhile, a to w in the tables mean the molar ratios of the respective monomer units, and also represent the names of the respective units.

It is preferable that the resin of the present invention is used as a toner material. There are no particular limitations on the kind of the toner, and the toner may be a toner according to a pulverization method, or may be a chemical toner prepared by emulsification-aggregation or the like. From the viewpoint that the characteristics of the resin of the present invention become more noticeable, it is more preferable that the resin is used in a chemical toner. Hereinafter, an embodiment as a chemical toner will be mainly described.

[Aqueous Resin Dispersion]

For the preparation of the toner of the present embodiment, it is preferable to use a dispersion of resin fine particles. From this viewpoint, the aqueous resin dispersion (hereinafter, may be simply referred to as "resin dispersion") of the present embodiment is constituted through the processes of including at least one kind of the dehydroabietic acid-derived particular polymer and dispersing this polymer in an aqueous medium. The dehydroabietic acid-derived polymer can constitute an aqueous dispersion having excellent self-dispersing properties and dispersion stability. When such an aqueous dispersion is constituted, it is particularly preferable that the acid value of the particular polymer is from 5 mg KOH/g to 25 mg KOH/g. When the acid value is equal to or greater than the lower limit, the sufficient surface charge can be applied to resin particles when an aqueous resin dispersion is formed. Therefore, dispersion stability is satisfactory, and aggregation can be suppressed, so that resin particles having a desired particle size can be obtained, which is preferable. Furthermore, when the acid value is equal to or less than the upper limit, generation of coarse particles can be suppressed, and a satisfactory particle size distribution can be obtained. Further, when the acid value is from 10 mg KOH/g to 15 mg KOH/g, it is more preferable in view of the dispersion stability described above.

Herein, regarding the self-dispersing properties, it is meant that, for example, when a dispersed state (particularly, a dispersed state according to a phase transfer emulsification method) is achieved in the absence of a surfactant, the dispersed state can be achieved in an aqueous medium by the functional group (particularly, an acidic group or a salt thereof) carried by the polymer itself, and it is meant that a resin dispersion which does not contain a free emulsifying agent can be constituted.

Further, the dispersed state includes both an emulsified state in which a polymer is dispersed in a liquid state in an aqueous medium (emulsion), and a dispersed state in which a polymer is dispersed in a solid state in an aqueous medium (suspension).

In the present invention, the polymer is preferably a water-insoluble polymer. The water-insoluble polymer refers to a polymer which, when the polymer is dried at 105° C. for 2 hours and then dissolved in 100 g of water at 25° C., the amount of dissolution of the polymer is 10 g or less, and the amount of dissolution of the polymer is preferably 5 g or less, and more preferably 1 g or less. The amount of dissolution is the amount of dissolution obtainable when a water-insoluble polymer is 100% neutralized with sodium hydroxide or acetic acid depending on the kind of the salt-generating group of the water-insoluble polymer.

Regarding the method for preparing an emulsified or dispersed state of a polymer, that is, an aqueous dispersion of the polymer, a phase transfer emulsification method may be used. An example of the phase transfer emulsification method may be a method of dissolving or dispersing a polymer in a solvent (for example, a hydrophilic organic solvent), subsequently introducing the solution or dispersion directly into water without adding a surfactant, stirring and mixing the mixture in a state in which the salt-generating group (for example, an acidic group) carried by the polymer is neutralized, removing the solvent, and then obtaining an aqueous dispersion that reaches an emulsified or dispersed state.

The dispersed state of the polymer particles means a state in which even after a solution obtained by dissolving 30 g of the polymer in 70 g of an organic solvent (for example, methyl ethyl ketone), a neutralizing agent capable of 100% neutralizing salt-generating groups of the polymer (sodium hydroxide if the salt-generating groups are anionic, and acetic acid if the salt-generating groups are cationic), and 200 g of water are mixed and stirred (apparatus: stirring apparatus equipped with stirring blade, speed of rotation: 200 rpm, for 30 minutes, 25° C.), and then the organic solvent is removed from the mixed liquid, it can be visually confirmed that the dispersed state exists stably for at least one week at 25° C.

[Binder for Toner]

The binder for toner of the present embodiment is configured to include at least one kind of the dehydroabietic acid-derived polymers and other components (for example, a resin) as necessary. The binder for toner can be applied to any of a melt kneading pulverization method which is a dry method, and a wet method of granulating toner particles in a liquid. Particularly, since the particular polymer derived from dehydroabietic acid has excellent self-dispersing properties and dispersion stability, the binder can be suitably used in a wet method of granulating toner from a polymer in a dispersed state.

Furthermore, the binder for toner of the present embodiment can contain at least one other resin as a component of the binder. The other resin may be a crystalline resin, and examples thereof include a polyester resin other than the dehydroabietic acid-derived polymer (hereinafter, also referred to as "other polyester resin"). In the present invention, it is preferable to prepare a resin composition containing the dehydroabietic acid-derived particular polymer and a crystalline resin, particularly in consideration of the toner application. Meanwhile, a composition in the present invention means that two or more components are substantially uniformly present at a specific composition. Herein, being substantially uniform means that various components may be unevenly distributed to the extent that the function effect of the present invention is provided. Furthermore, regarding the composition, as long as the definition described above is satisfied, the form is not particularly limited and is not limited to a fluid liquid or paste, and the composition means to include a solid, a powder and the like, all containing plural components. Furthermore, even in a case where a precipitate is present, the term composition means to include something of which dispersed state is maintained for a predetermined time by stirring.

Examples of the other polyester resin include those obtainable mainly by a polycondensation reaction between a polyvalent carboxylic acid and a polyhydric alcohol.

Examples of the polyvalent carboxylic acid include aromatic carboxylic acids such as terephthalic acid, isophthalic acid, phthalic anhydride, trimellitic anhydride, pyromellitic acid, and naphthalenedicarboxylic acid; aliphatic carboxylic acids such as maleic anhydride, fumaric acid, succinic acid, alkenylsuccinic anhydride, and adipic acid; and alicyclic carboxylic acids such as cyclohexanedicarboxylic acid. These polyvalent carboxylic acids can be used singly or as mixtures of two or more kinds. Among these polyvalent carboxylic acids, it is preferable to use an aromatic carboxylic acid. Furthermore, in order to secure satisfactory fixability, it is preferable that the polyester resin takes a crosslinked structure or a branched structure, and in order to do so, it is preferable to use, as the polyvalent carboxylic acid, a trivalent or higher-valent carboxylic acid (trimellitic acid or acid anhydrides thereof) in combination with the dicarboxylic acid.

Examples of the polyhydric alcohol include aliphatic diols such as ethylene glycol, diethylene glycol, triethylene glycol, propylene glycol, butanediol, hexanediol, neopentyl glycol, and glycerin; alicyclic diols such as cyclohexanediol, cyclohexanedimethanol, and hydrogenated bisphenol A; and aromatic diols such as an ethylene oxide adduct of bisphenol A, and a propylene oxide adduct of bisphenol A. These polyhydric alcohols can be used singly or as mixtures of two or more kinds. Among these polyhydric alcohols, it is preferable to use aromatic diols or alicyclic diols, among these, it is more preferable to use aromatic diols. Furthermore, in order to secure satisfactory fixability, it is preferable that the polyester resin takes a crosslinked structure or a branched structure, and in order to do so, it is preferable to use, as the polyhydric alcohols, a trivalent or higher-valent polyhydric alcohols (glycerin, trimethylolpropane or pentaerythritol) in combination with the diol.

The glass transition temperature (hereinafter, may be abbreviated to "Tg") of the other polyester resin is preferably from 40° C. to 80° C., and more preferably from 50° C. to 70° C. When the Tg of the polyester resin is 80° C. or lower, low temperature fixability is obtained, and when the Tg is 40° C. or higher, sufficient thermal storability and preservability of fixed images are obtained.

Furthermore, the molecular weight (weight average molecular weight) of the other polyester resin is preferably from 5,000 to 40,000, from the viewpoints of productivity of the resin, fine-dispersing at the time of toner production, and a compatible toner at the time of melting.

Crystalline Polyester Resin

It is preferable that the other polyester resin contains at least one crystalline polyester resin. When the polyester resin contains a crystalline polyester resin, the low temperature fixability of the toner becomes more satisfactory. Further, since the heating temperature in the fixing process is low, deterioration of the fixing unit is suppressed. When the polyester resin contains a crystalline polyester resin and a non-crystalline resin, the crystalline polyester resin is compatibilized with the non-crystalline polyester resin at the time of melting and significantly decreases the toner viscosity, and thus a toner having excellent low temperature fixability or excellent image glossiness can be obtained.

Furthermore, among the crystalline polyester resin, aliphatic crystalline polyester resins are particularly preferable because those polyester resins have preferable melting points as compared with aromatic crystalline resins.

The content of the crystalline polyester resin in the polyester resin is preferably from 2% by mass to 20% by mass, and more preferably from 2% by mass to 14% by mass. When the content of the crystalline polyester resin is 2% by mass or more, the non-crystalline polyester resin can be sufficiently made to have low viscosity at the time of melting, and an enhancement of low temperature fixability can be easily obtained. Further, when the content of the crystalline polyester resin is 20% by mass or less, since deterioration of chargeability of the toner that is attributable to the presence of the crystalline polyester resin can be suppressed, it is likely to obtain image strength after fixing onto a recording medium.

The melting point of the crystalline polyester resin is preferably in the range of from 50° C. to 100° C., more preferably in the range of from 55° C. to 95° C., and even more preferably in the range of from 60° C. to 90° C. When the melting point of the crystalline polyester resin is 50° C. or higher, preservability of the toner or preservability of the toner image after fixing is satisfactory, and when the melting point is 100° C. or lower, an enhancement of low temperature fixability can be easily obtained.

The crystalline polyester resin is synthesized from an acid (dicarboxylic acid) component and an alcohol (diol) component, and as will be described below, an "acid-derived constituent component" refers to a constituent moiety in a polyester resin, which is an acid component before the synthesis of the polyester resin, and an "alcohol-derived constituent component" refers to a constituent moiety which is an alcohol component before the synthesis of the polyester resin.

Acid-Derived Constituent Component

Examples of the acid to become the acid-derived constituent component include various dicarboxylic acids, but the acid-derived constituent component for the crystalline polyester resin related to the embodiment is preferably a straight-chain type aliphatic dicarboxylic acid. Examples include oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, 1,18-octadecanedicarboxylic acid, and lower alkyl esters and acid anhydrides thereof, but there are no limitations. Among these, in view of easy availability, adipic acid, sebacic acid, and 1,10-decanedicarboxylic acid are preferred.

The acid-derived constituent component may include, in addition to that, constituent components such as a dicarboxylic acid-derived constituent component having a double bond, and a dicarboxylic acid-derived constituent component having a sulfonic acid group.

Meanwhile, the term "constitution mol %" in the present specification refers to the percentage when the relevant acid-derived constituent component among all of the acid-derived constituent components in the polyester resin, or the relevant alcohol constituent component among all the alcohol-derived constituent components, is considered as a single unit (mol).

Alcohol-Derived Constituent Component

The alcohol to be the alcohol constituent component is preferably an aliphatic diol, and examples include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-dodecanediol, 1,12-undecanediol, 1,13-tridecanediol, 1,14-tetradecanediol, 1,18-octadecanediol, and 1,20-eicosanediol, but there are no limitations. Among these, in view of easy availability and cost, 1,4-butanediol, 1,6-hexanediol, 1,8-octanediol, 1,9-nonanediol, and 1,10-decanediol are preferred.

The molecular weight (weight average molecular weight) of the crystalline polyester resin is preferably from 8,000 to 40,000, and more preferably from 10,000 to 30,000, from the viewpoints of productivity of the resin, fine-dispersing at the production of the toner, and a compatible toner at the time of melting. When the molecular weight is 8,000 or greater, since a decrease in resistance of the crystalline polyester resin can be suppressed, a decrease in chargeability can be prevented. When the molecular weight is 40,000 or less, the cost for resin synthesis is suppressed to a low level, and since a decrease in sharp-melting property is prevented, low temperature fixability is not adversely affected.

The binder for toner of the present embodiment may contain a resin other than the other polyester resin. Examples include ethylene-based resins such as polyethylene and polypropylene; styrene-based resins such as polystyrene and α-polymethylstyrene; (meth)acrylic resins such as polymethyl methacrylate and polyacrylonitrile; polyamide resins, polycarbonate resins, polyether resins, and copolymer resins thereof.

The content percentage of the dehydroabietic acid-derived polymer in the binder for toner of the present embodiment is, for example, preferably 10% to 95% by mass, and more preferably 20% to 80% by mass. Furthermore, in connection with the crystalline resin, it is preferable that the dehydroabietic acid-derived polymer is incorporated in an amount of 400 parts to 9900 parts by mass, and it is more preferable that the dehydroabietic acid-derived polymer is incorporated in an amount of 614 parts to 4900 parts by mass with respect to the crystalline resin of 100 parts by mass.

[Toner]

The dehydroabietic acid-derived polymer of the present embodiment can be suitably used, particularly as a binder for toner among the composite materials described above. The toner of the present embodiment only needs to contain a pigment, a mold releasing agent, and the dehydroabietic acid-derived polymer of the present embodiment. If necessary, the toner can contain a charge control agent, a carrier, an external additive, and the like.

To the toner, inorganic fine-powder and organic fine-particles may be externally added for the purposes of improving the fluidity, controlling the electric charge, or other purposes. For example, silica fine-particles or titania fine-particles, of which surface is treated with a coupling agent containing an alkyl group, are preferably used. These preferably have a number average primary particle diameter of 10 to 500 nm, and preferably are added into the toner in an amount of 0.1 to 20 mass %.

The pigment is not limited, and any of organic pigments and inorganic pigments can be used. Examples of the organic pigments include azo pigments, polycyclic pigments, dye chelates, nitro pigments, nitroso pigments, and aniline black. Among these, azo pigments, polycyclic pigments and the like are more preferred. Furthermore, examples of the inorganic pigments include titanium oxide, iron oxide, calcium carbonate, barium sulfate, aluminum hydroxide, barium yellow, cadmium red, chrome yellow, and carbon black. Among these, carbon black is particularly preferred as a black pigment. It is preferable to add these to the toner in an amount of, for example, 1% to 30% by mass, preferably 5% to 20% by mass, and when a magnetic body is used as a black pigment, in an amount of 30% to 85% by mass. The dehydroabietic acid-derived particular polymer used in the toner of the present embodiment has excellent compatibility with a crystalline resin that is used in combination in order to extend the fixing temperature range. Thereby, when the toner of the present embodiment is used, an image having excellent transparency and glossiness is obtained. Therefore, particularly when the toner is a toner combined with a colorant for color toner, it is preferable because high quality color images can be obtained.

As a binder, it only needs to contain the dehydroabietic acid-derived polymer of the present embodiment. It is preferable to add the binder to the toner in an amount of, for example, 10% to 95% by mass. It is more preferable to add in an amount of 20% to 80% by mass. Furthermore, other binders that are generally used can also be used in combination. Examples include ethylene-based resins such as polyethylene and polypropylene; styrene-based resins such as polystyrene and α-polymethylstyrene; (meth)acrylic resins such as polymethyl methacrylate and polyacrylonitrile; polyamide resins, polycarbonate resins, polyether resins, and copolymer resins thereof.

Furthermore, the binder may also be constructed using the binder for toner described above.

All the release agents which have been conventionally used for toner may be used as the release agents. Specifically, mention may be made of olefins, such as low-molecular-weight polypropylenes, low-molecular-weight polyethylenes, and ethylene/propylene copolymers; microcrystalline wax, carnauba wax, sasol wax, paraffin wax, and the like. These release agents is added to the toner preferably in an amount of, for example, 3% to 20% by mass, and more preferably in an amount of 5% to 18% by mass.

The charge-control agent may be added, if required. They are preferably achromatic from the viewpoint of color-forming property. Examples include compounds having a quaternary ammonium salt structure, compounds having a calixarene structure, and azo complex dyes. The charge-control agent is added to the toner preferably in an amount of, for example, 0.5% to 10% by mass, and more preferably in an amount of 1% to 5% by mass.

The carrier to be used may be either an uncoated carrier composed of only magnetic material particles of iron, ferrite, or the like, or a resin-coated carrier obtained by coating the surface of a magnetic material particle with a resin or the like. The average particle size of this carrier is preferably 30 to 150 μm in terms of volume average particle size.

Regarding the external additive, known particles including inorganic particles such as silica particles, titanium oxide particles, alumina particles, cerium oxide particles, and carbon black of which surfaces are subjected to a hydrophobic treatment; and polymer particles of polycarbonate, polymethyl methacrylate, a silicone resin and the like can be used. Among these, it is preferable that two or more kinds of external additives are used, and at least one kind of the external additives have an average primary particle size preferably in the range of from 30 nm to 200 nm, and more preferably in the range of from 30 nm to 180 nm.

When the toner has a smaller particle size, the non-electrostatic adhesive force to the photoreceptor is increased. Therefore, this increase causes defective transfer or fine line image fall-out, and causes the occurrence of transfer unevenness of superimposed images and the like. Therefore, when a large-sized external additive having an average primary particle size of from 30 nm to 200 nm is added, transferability can be improved.

If the average primary particle size of the external additive is smaller than 30 nm, the initial fluidity of the toner is satisfactory, but there are occasions in which the non-electrostatic adhesive force between the toner and the photoreceptor cannot be sufficiently reduced, and transfer efficiency is decreased, so that image fall-out occurs or the image uniformity may be deteriorated. Furthermore, there are occasions in which external additive particles are embedded in the toner surface due to the stress in the developing machine over time, chargeability may change, and problems such as a decrease in the copy density or fogging of the background section may be caused. If the average primary particle size of the external additive is larger than 200 nm, the external additive is likely to be detached from the toner surface, and may cause deterioration of fluidity.

—Characteristics of Toner—

Furthermore, the toner of the present embodiment is such that the average degree of circularity is preferably in the range of from 0.960 to 0.980, and more preferably in the range of from 0.960 to 0.970. Regarding the shape of the toner, a spherical toner is advantageous in terms of developability and transferability; however, in view of cleanability, the spherical toner may be inferior to an amorphous type. When the toner has a shape of the range described above, the transfer efficiency and image compactness can be increased, high quality image formation can be achieved, and cleanability of the photoreceptor surface can be improved.

Furthermore, the volume average particle size of the toner of the present embodiment is preferably from 3 μm to 9 μm, more preferably from 3.5 μm to 8.5 μm, and even more preferably from 4 μm to 8 μm. When the volume average particle size is 3 μm or greater, since a decrease in the fluidity of the toner is suppressed, chargeability of the various particles can be easily maintained. Furthermore, the charge distribution does not spread out, fogging in the background is prevented, and it becomes difficult for the toner to overflow from the developing machine. Furthermore, when the volume average particle size of the toner is 3 μm or greater, cleanability is improved. When the volume average particle size is 9 μm or less, since a decrease in resolution is suppressed, a satisfactory image quality can be obtained, and the demand for high image quality of recent years can be satisfied.

The particle size distribution index of the toner is such that the volume average particle size distribution index GSDv is preferably 1.30 or less, more preferably from 1.15 to 1.28, and even more preferably from 1.17 to 1.26. If the GSDv is larger than the range described above, clarity and resolution of the image may deteriorate.

Furthermore, it is preferable that the number average particle size distribution index GSDp is 1.30 or less. If the GSDp is greater than the range described above, the proportion of toner particles with a smaller size increases, and therefore, it may be difficult to achieve electrostatic control.

Meanwhile, the volume average particle size D50 is based on the particle size distribution measured with an analyzer such as a Coulter counter TAII or a Multisizer-II (manufactured by Beckman Coulter, Inc.), and for partitioned particle size ranges (channels), cumulative distributions of volume and number are respectively drawn from the smaller size side. Here, the particle size at a cumulative 16% is defined as volume D16v or number D16P; the particle size at a cumulative 50% is defined as volume D50v or number D50P: and the particle size at a cumulative 84% is defined as volume D84v or number D84P. Using these values, the volume average particle size distribution index (GSDv) is calculated as $(D84v/D16V)^{1/2}$.

The SF1 is digitized by mainly analyzing a microscopic image or a scanning electron microscope (SEM) image using an image analyzing apparatus, and can be calculated, for example, as follows. That is, SF1 can be obtained by inputting an optical microscopic image of toner particles spread on the surface of a slide glass to a Luzex image analyzer through a video camera, determining the maximum lengths and projected areas of 100 particles, calculating SF1 values by the above formula (1), and determining the average value.

(Method for Producing Toner for Electrostatic Development)

The method for producing a toner according to the present embodiment is not particularly limited, and conventionally used methods can be applied. Among the methods, it is preferable that the method includes a process of forming toner particles by a wet method (for example, an aggregation coalescence method, a suspension polymerization method, a dissolution suspension granulation method, a dissolution suspension method, or a dissolution emulsification aggregation coalescence method); and a process of washing the toner particles.

For the method for forming toner particles, as described above, a wet production method of producing toner particles in a water-based medium is suitable, but particularly an emulsification aggregation method is preferred, and an emulsification aggregation method using a phase transfer emulsification method is more desirable.

An emulsification aggregation method is a method of respectively preparing dispersion liquids (an emulsified liquid, a pigment dispersion liquid and the like) containing the components included in the toner (a binding resin, a coloring agent, and the like), mixing these dispersion liquids, aggregating the toner components to produce aggregate particles, thereafter heating the aggregate particles to a temperature higher than or equal to the melting point or glass transition temperature of the binding resin, and thereby thermally fusing the aggregate particles.

The emulsification aggregation method can easily produce toner particles having a smaller size, and can easily obtain a uniform toner having a narrow particle size distribution, as compared with a kneading pulverization method which is a dry method, or a melt suspension method, a dissolution suspension method and the like which are other wet methods. Furthermore, shape control is easier, and a uniform amorphous toner can be produced, as compared with the melt suspension method, the dissolution suspension method and the like. Moreover, the structure of the toner such as coating film formation is controlled, so that when the toner contains a mold releasing agent or a crystalline polyester resin, since exposure of the surfaces of these components is suppressed, deterioration of chargeability or preservability is prevented.

Furthermore, when a toner is produced by the emulsification aggregation method using the binder for toner containing the dehydroabietic acid-derived polymer of the present embodiment, the resin particle stability in an aqueous resin dispersion is satisfactory, and a toner having a small particle size and an excellent particle size distribution is produced.

Furthermore, in regard to the details of the wet production method for toner, for examples the methods described in JP-A-2009-229919, JP-A-2009-46559, JP-A-2009-151241, Japanese Patent No. 3344169, Japanese Patent No. 3141783, JP-A-2008-165017, JP-A-2010-20170, and JP-A-2010-210959 can also be suitably applied to the present embodiment.

The image forming method to which the toner of the present embodiment is applied is not particularly limited, but examples include a method of forming an image on a photoreceptor, subsequently performing transfer, and forming an image; and a method of sequentially transferring images formed on a photoreceptor to an intermediate transfer body or the like, forming an image on the intermediate transfer body or the like, subsequently transferring the image to an image forming member such as paper, and thereby forming an image.

EXAMPLES

The present invention will be described in more detail based on the following examples, but the present invention is not intended to be limited thereto.

Synthesis Example

Synthesis examples of dehydroabietic acid-derived monomers (DHA-1 to 3)

In the following synthesis examples of dehydroabietic acid-derived monomers, the structures of the synthesized monomers were checked using $^1$H-NMR and liquid chromatography in all cases.

Synthesis Example 1

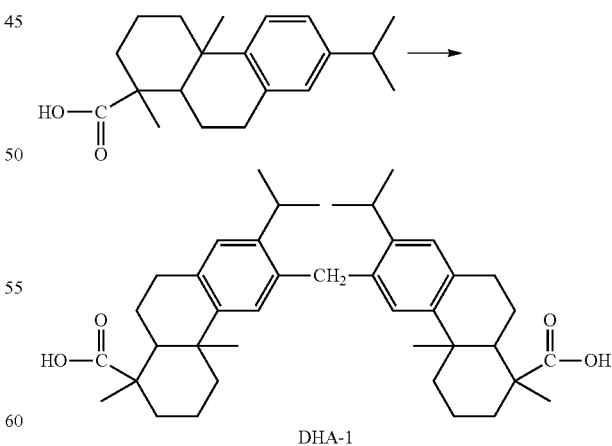

DHA-1

Sulfuric acid (30 ml) was added dropwise to acetic acid (100 ml) under ice cooling. Then, dehydroabietic acid (manufactured by ARAKAWA CHEMICAL INDUSTRIES, LTD., 30.0 g) and paraformaldehyde (2.1 g) were added thereto at room temperature, and the mixture was stirred for 3 hours at 40° C. The reaction liquid was poured into 1 L of cold water, and the organic layer was extracted with ethyl acetate. The extract liquid was washed with water until the washing liquid became almost neutral, and the extract liquid was dried over anhydrous magnesium sulfate. Then, the solvent was distilled away under reduced pressure. 80 ml of methanol was added to the residue, and white crystals were collected by filtration and dried. Thus, DHA-1 (19.8 g) was obtained.

Synthesis Example 2

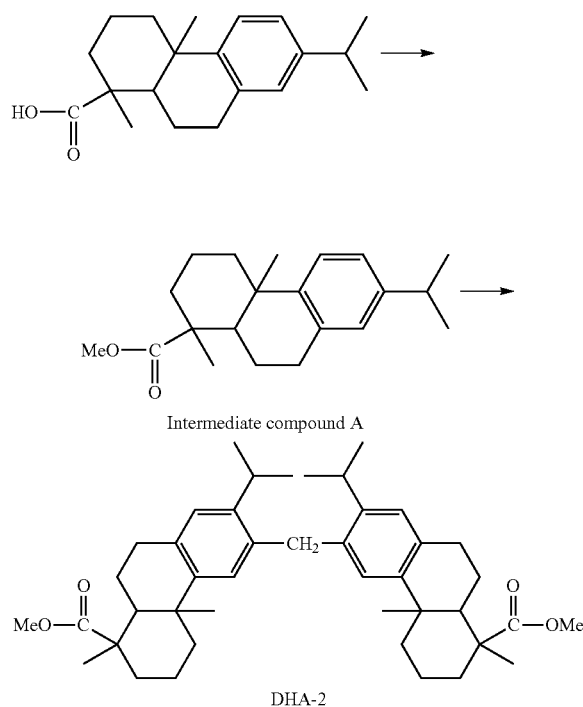

Intermediate compound A

DHA-2

To a mixture of dehydroabietic acid (manufactured by ARAKAWA CHEMICAL INDUSTRIES, LTD., 30.0 g) and methylene chloride (60 ml), oxalyl chloride (13 g) was added dropwise thereto at room temperature. After the mixture was stirred for 3 hours, the solvent was distilled away under reduced pressure, and 16 g of methanol was added dropwise thereto. After the mixture was stirred for 3 hours at room temperature, excess methanol was distilled away under reduced pressure, and an intermediate compound A (31 g) was obtained.

The intermediate compound A (31 g) and paraformaldehyde (2.1 g) were added to methylene chloride (150 ml), and sulfuric acid (50 ml) was added dropwise thereto at 10° C. to 15° C. After the dropwise addition, the mixture was stirred for 5 hours at room temperature, 500 ml of ice water was added thereto, and the organic layer was separated. The organic layer was washed with water until the washing liquid became neutral and then was dried over anhydrous magnesium sulfate, and methylene chloride was distilled away. 50 ml of methanol was added to the residue, and the mixture was stirred for 3 hours at room temperature. Then, white crystals were collected by filtration and dried. Thus, DHA-2 (20.2 g) was obtained.

Synthesis Example 3

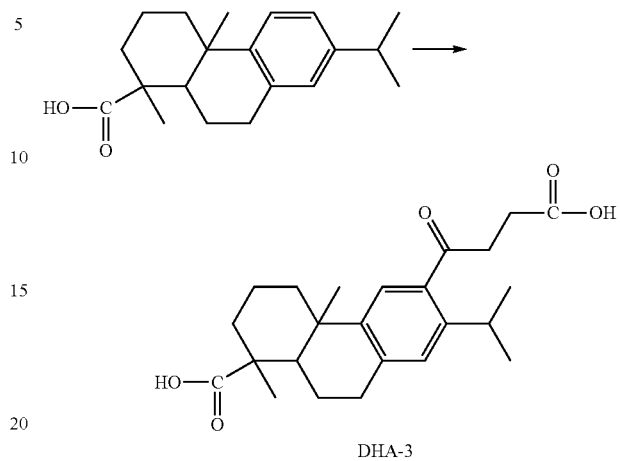

DHA-3

Dehydroabietic acid (75 g) and succinic anhydride (38 g) were dissolved in methylene chloride (1 L). Under ice cooling, anhydrous aluminum chloride (130 g) was added little by little thereto. The mixture was stirred for 2 hours at 10° C. to 15° C., and then the reaction liquid was poured into ice water. White crystals thus produced were collected by filtration, washed with water, and further washed with methanol. Thus, DHA-3 (72 g) was obtained.

Polymerization Example

Synthesis examples of the dehydroabietic acid-derived polymers

In the following synthesis examples of the dehydroabietic acid-derived polymers, the structures of the synthesized polymers were checked using $^1$H-NMR in all cases. Furthermore, the content percentage of the aromatic ring in the polymer was calculated therefrom. Further, the weight average molecular weight and molecular weight distribution (weight average molecular weight/number average molecular weight) of the polymer were measured under the conditions described above using GPC.

The glass transition point was measured under the conditions described below, using a differential scanning calorimeter (manufactured by SII Technology, Inc., DSC6200). Measurement was carried out two times per sample, and the second measurement results were employed.

Atmosphere in the measuring chamber: Nitrogen (50 mL/min)
Rate of temperature rise: 10° C./min
Measurement initiation temperature: 0° C.
Measurement completion temperature: 200° C.
Sample pan: pan made of aluminum
Mass of measurement sample: 5 mg
Determination of Tg: The median temperature between the drop initiation point and the drop completion point of the DSC chart was designated as Tg.

Furthermore, the acid value was measured by the method described in JIS standard (JIS K 0070:1992). The properties of the polymers thus obtained are shown in Table 1.

(Polymerization Example 1) Synthesis of P-8

Figure 2:
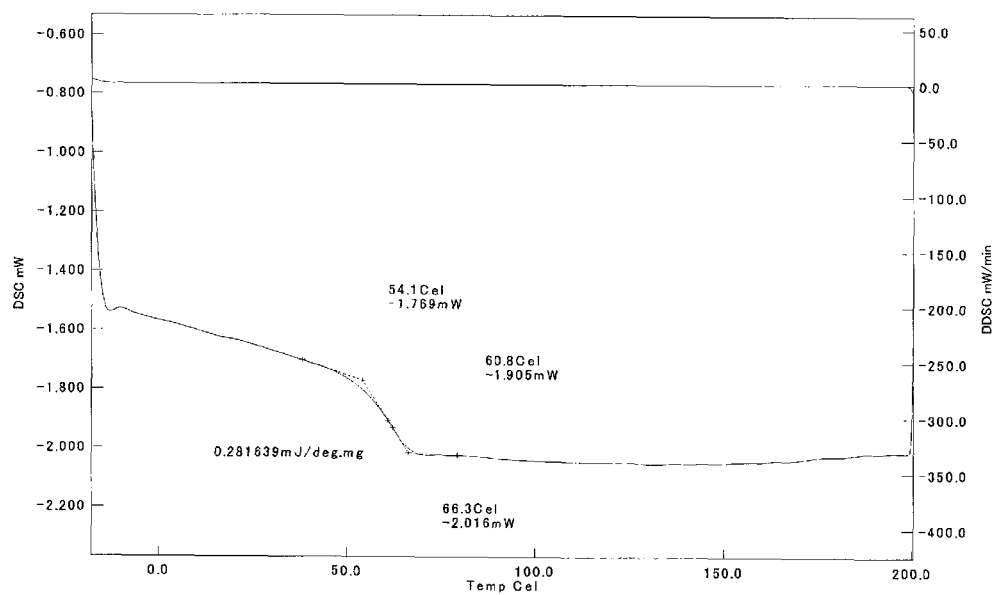
FIG. 2 is a DSC chart for polymer P-8 prepared in Examples.

A mixture of DHA-2 (200 g), sebacic acid (15.78 g), dodecenylsuccinic anhydride (23.98 g), terephthalic acid (19.94 g), BA-2 glycol (2-mol ethylene oxide adduct of bisphenol A, manufactured by Nippon Nyukazai Co., Ltd.) (109.17 g), 1,10-decanediol (60.14 g), and ethyl ortho-titanate (250 µL) was heated and stirred for 70 minutes at 240° C. under a nitrogen gas stream, and water thus produced was distilled away. Then, the temperature was raised to 260° C., and while the water and methanol produced along with the progress of polymerization were distilled away, the reaction mixture was heated and stirred without any change for 3 hours. Then, trimellitic anhydride (11.5 g) was added thereto, and the reaction was continued for one hour. The reactant thus obtained was taken out into a Teflon (registered trademark)-made heat resistant container, and a polymer P-8 (weight average molecular weight: 14,700, molecular weight distribution: 3.3, glass transition temperature: 61° C., acid value: 11 mg KOH/g) was obtained. A DSC chart and the Tg of polymer P-8 were determined. This auxiliary line is shown in FIG. 2.

The other polymers shown in Table 1 were synthesized by methods conforming to the above description.

(Comparative Polymerization Example) Amorphous Polyester (1) of JP-A-2008-165017

2-mol ethylene oxide adduct of bisphenol A: 60 mol %
2-mol propylene oxide adduct of bisphenol A: 40 mol %
Terephthalic acid dimethyl ester: 65 mol %
Dodecenylsuccinic acid: 30 mol %
Trimellitic acid: 5 mol %
(Herein, the alcohol components and the acid components were respectively adjusted to 100 mol %. The same also applies to the following.)

In a flask having an internal capacity of 5 L and equipped with a stirring apparatus, a nitrogen inlet tube, a temperature sensor and a rectification column, monomers having the above-described composition ratios were introduced, and the temperature was raised to 190° C. over one hour. After it was confirmed that the reaction system was stirred without any fluctuation, 1.0% by mass of dibutyltin oxide was introduced. Furthermore, while water thus produced was distilled away, the temperature was raised from the same temperature to 240° C. over 6 hours, and a dehydration condensation reaction was continued for another 2 hours at 240° C. Thus, an amorphous branched polyester resin cP-1 having a glass transition point of 58° C., an acid value of 15.0 mKOH/g, a weight average molecular weight of 40,000, and a number average molecular weight of 6,500 was obtained.

(Comparative Polymerization Example) Example where the Content Percentage of the Aromatic Ring is 0%

A mixture of DHA-2 (200 g), dodecenylsuccinic anhydride (20.78 g), tetraethylene glycol (78.00 g) and ethyl ortho-titanate (250 µL) was heated and stirred for 70 minutes at 240° C. under a nitrogen gas stream, and water thus produced was distilled away. Then, the temperature was raised to 260° C., and while the water and methanol produced along with the progress of polymerization were distilled away, the reaction mixture was heated and stirred without any change for 3 hours. Then, trimellitic anhydride (11.5 g) was added thereto, and the reaction was continued for one hour. The reactant thus obtained was taken out into a Teflon (registered trademark)-made heat resistant container, and a polymer cP-2 (weight average molecular weight: 14,200, molecular weight distribution: 3.2, glass transition point: 51° C., and acid value: 12 mg KOH/g) was obtained.

(Comparative Polymerization Example) Example where the Total Carbon Number of $G^1$ in Formula (I) is 3

A mixture of DHA-2 (200 g), dimethyl terephthalate (141.38 g), 1,3-propanediol (163.82 g) and ethyl ortho-titanate (250 µL) was heated and stirred for 70 minutes at 240° C. under a nitrogen gas stream, and water thus produced and methanol were distilled away. Then, the temperature was raised to 260° C., and while the water and methanol produced along with the progress of polymerization as well as an excess 1,3-propanediol were distilled away, the reaction mixture was heated and stirred without any change for 3 hours. Then, trimellitic anhydride (9.19 g) was added thereto, and the reaction was continued for one hour. The reactant thus obtained was taken out into a Teflon (registered trademark)-made heat resistant container, and a polymer cP-3 (weight average molecular weight: 13,000, molecular weight distribution: 3.1, glass transition point: 65° C., and acid value: 13 mg KOH/g) was obtained.

(Crystalline Polyester Resin Dispersion Liquid (I))

In a heated and dried three-necked flask, 100 mol % of 1,10-decanedicarboxylic acid and 100 mol % of 1,9-nonanediol at a monomer composition ratio were introduced, and dibutyltin oxide as a catalyst was introduced therein in an amount to make the content 0.3% by mass. Then, the air inside the container was changed to an inert atmosphere with nitrogen gas by a pressure-reducing operation, and stirring and refluxing were carried out by mechanical stirring at 180° C. for 5 hours.

Thereafter, the temperature was slowly raised up to 230° C. under reduced pressure, and the mixture was stirred for 2 hours. When the reaction system reached a viscous state, the system was air-cooled, and the reaction was terminated. Thus, a crystalline polyester resin (I) was synthesized.

The weight average molecular weight of the crystalline polyester resin (I) thus obtained was 25,000, and the number average molecular weight was 5,800. Furthermore, the melting point (Tm) of the crystalline polyester resin (I) was measured by the measurement method described above using a differential scanning calorimeter (DSC), and a clear endothermic peak appeared. The endothermic peak temperature was 75° C.

Crystalline Polyester Resin (I): 90 Parts by Mass
Ionic surfactant (NEOGEN RK, Dai-ichi Kogyo Seiyaku Co., Ltd.): 2.0 parts by mass
Ion exchanged water: 210 parts by mass The above components were mixed and heated to 100° C., and the mixture was dispersed with ULTRA-TURRAX T50 manufactured by IKA AG. Then, the resultant was heated to 110° C. with a pressure ejection type Gaulin homogenizer and was subjected to a dispersion treatment for one hour. Thus, a crystalline polyester resin dispersion liquid (I) having a volume average particle size of 0.15 µm and a solid content of 30% by mass was obtained.

(Crystalline Polyester Resin Dispersion Liquid (II))

In a heated and dried three-necked flask, 100 mol % of dimethyl 1,8-sebacate and 100 mol % of 1,6-hexanediol at a monomer composition ratio were introduced, and dibutyltin oxide as a catalyst was introduced therein in an amount to make the content 0.3% by mass. Then, the air inside the container was changed to an inert atmosphere with nitrogen gas by a pressure-reducing operation, and stirring and refluxing were carried out by mechanical stirring at 180° C. for 5 hours.

Thereafter, the temperature was slowly raised up to 230° C. under reduced pressure, and the mixture was stirred for 4 hours. When the reaction system reached a viscous state, the system was air-cooled, and the reaction was terminated. Thus, a crystalline polyester resin (II) was synthesized.

The weight average molecular weight of the crystalline polyester resin (II) thus obtained was 22,000, and the number average molecular weight was 4,400. Furthermore, the melting point (Tm) of the crystalline polyester resin (II) was measured by the measurement method described above using a differential scanning calorimeter (DSC), and a clear endothermic peak appeared. The endothermic peak temperature was 72° C.

Crystalline Polyester Resin (II): 90 Parts by Mass
 Ionic surfactant (NEOGEN RK, Dai-ichi Kogyo Seiyaku Co., Ltd.): 1.8 parts by mass
 Ion exchanged water: 210 parts by mass The above components were mixed and heated to 100° C., and the mixture was dispersed with ULTRA-TURRAX T50 manufactured by IKA AG. Subsequently, the resultant was heated to 110° C. with a pressure ejection type Gaulin homogenizer and was subjected to a dispersion treatment for one hour. Thus, a crystalline polyester resin dispersion liquid (II) having a volume average particle size of 0.14 μm and a solid content of 30% by mass was obtained.

Example and Comparative Example

A resin composition was prepared as follows, using the dehydroabietic acid-derived polymer P-1 obtained as described above.

(Preparation of Resin Dispersion)

A mixture of the polymer (10 g) and methyl ethyl ketone (7.5 g) was heated and stirred at 60° C. to dissolve. Subsequently, isopropanol (2.5 g) was added thereto, the mixture was naturally cooled to room temperature, and then a 10 mass % ammonia water (0.55 ml) was added thereto at room temperature. Ion exchanged water (40 g) was added slowly to this solution at a flow rate of 1.57 (g/ml), and thus phase transfer emulsification was carried out. Thereafter, the solvent was distilled away in an evaporator under reduced pressure, and thus a resin dispersion 101a was obtained.

A toner and a developer were prepared using the resin dispersion 101a described above, a colorant dispersion and a mold releasing agent dispersion liquid prepared as follows. Then, the toner and the developer were evaluated. The results are shown in the following table.

(Preparation of Colorant Dispersion)

A cyan pigment (manufactured by Dainichiseika Color and Chemicals Manufacturing Co., Ltd., Pigment Blue 15:3, copper phthalocyanine) (100 parts by mass), an anionic surfactant (manufactured by Dai-ichi Kogyo Seiyaku Co., Ltd., NEOGEN R) (10 parts by mass), and ion exchanged water (350 parts by mass) were mixed, and the mixture was dispersed in a high pressure impact disperser (HJP30006, manufactured by SUGINO MACHINE LIMITED) for one hour. Thus, a black colorant dispersion was obtained.

(Preparation of Mold Releasing Agent Dispersion)

Paraffin wax (HNP-9, manufactured by NIPPON SEIRO CO., LTD.) (60 parts by mass), anionic surfactant NEOGEN R (6 parts by mass), and ion exchanged water (200 parts by mass) were mixed, and the mixture was heated to 100° C. to melt. The mixture was dispersed using a high pressure homogenizer (manufactured by APV Gaulin GmbH), and thus a mold releasing agent dispersion was obtained.

(Preparation of Toner)

Ion exchanged water (280 parts by mass), an anionic surfactant (manufactured by Dai-ichi Kogyo Seiyaku Co., Ltd., NEOGEN RK (20%)) (2.8 parts by mass), the resin dispersion 101a (300 parts by mass), and the crystalline resin dispersion liquid (I) (67 parts by mass) were introduced into a 3-L three-necked flask equipped with a thermometer, a pH meter and a stirrer, and the mixture was stirred for 30 minutes at a temperature of 30° C. and a speed of rotation of 150 rpm.

Then, the colorant dispersion (60 parts by mass) and the mold releasing agent dispersion (80 parts by mass) were added thereto, and the mixture was stirred for 5 minutes. Furthermore, 1% nitric acid was added thereto in small amounts to adjust the pH to 3.0. Thereafter, polyaluminum chloride (0.4 parts by mass) was added thereto, and the temperature was raised up to 50° C. Then, 180 parts of the resin dispersion was added thereto.

After the mixture was stirred for 30 minutes, the pH was adjusted to 9.0 by adding a 5 mass % aqueous solution of sodium hydroxide. Subsequently, the temperature was raised up to 90° C., and the mixture was stirred for 3 hours at 90° C. and then cooled. Thus, a toner dispersion 101b was obtained.

(Preparation of Toner Particles)

The toner particle dispersion liquid obtained as described above was filtered and washed with ion exchanged water. The toner particles were dispersed again in ion exchanged water, filtered, and washed. This operation was further repeated twice, and then the pH of the toner particle dispersion liquid was adjusted to 4.0 with 1% nitric acid. The toner particles were filtered and washed with ion exchanged water until the electrical conductivity of the liquid reached 15 μS/cm or less. Then, the toner particles were dried under reduced pressure for 5 hours in an oven at 40° C., and thus toner particles were obtained. Furthermore, 1.5 parts by mass of hydrophobic silica (manufactured by Nippon Aerosil Co., Ltd., RY50) and 1.0 parts by mass of hydrophobic titanium oxide (manufactured by Nippon Aerosil Co., Ltd., T805) were added to 100 parts by mass of the toner particles thus obtained, and the mixture was mixed and blended using a sample mill at 10,000 rpm for 30 seconds. Thereafter, the blend was sieved with a vibrating sieve with a mesh size of 45 μm, and thus a toner 101 was obtained.

Various testing toners 102 to 116, c11, c12 and c13 were prepared in the same manner as in the preparation of the toner 101, except that the kinds of the particular polymers and crystalline polymers used were changed as shown in the following tables.

(Preparation of Carrier)

A silicone resin (SR2411, manufactured by Dow Corning Toray Co., Ltd.) (300 parts by mass), toluene (1200 parts by mass), and a ferrite core material (5 kg) having an average particle size of 50 μm were introduced into a rotating disc type fluidized bed coating apparatus, and the surface of the ferrite was coated with the silicone resin. Then, the coated material was taken out and heated for 2 hours at 250° C. to age the coated film. Thus, a carrier was obtained.

(Preparation of Developer)

The toner and the carrier were mixed such that the toner concentration would be 5% by mass and the total amount would be 1 kg, and thus a developer was obtained.

(Evaluation)

—Dispersing Properties—

The average particle size (volume average particle size, median diameter) of the resin dispersion was measured using a laser diffraction type particle size distribution analyzer (manufactured by HORIBA, Ltd., LA-920), and the average particle size was evaluated according to the following evaluation criteria.

~Evaluation Criteria~

A: The average particle size was equal to or greater than 80 nm and less than 180 nm.
B: The average particle size was equal to or greater than 50 nm and less than 80 nm, or equal to or greater than 180 nm and less than 250 nm.
C: The average particle size was equal to or greater than 250 nm and less than 800 nm.
D: The average particle size was equal to or greater than 800 nm, or unmeasurable.

—Compatibility—

82 parts by mass of the resin of the present invention and 18 parts by mass of the crystalline resin were melt-kneaded, and transparency of the kneaded material thus obtained was visually checked. Thus, compatibility was evaluated based on the criteria described below.

AA: The kneaded material is transparent when melted at a high temperature, and maintains transparency for 10 hours or longer even at room temperature.
A: The kneaded material is transparent when melted at a high temperature, and becomes turbid within 10 hours at room temperature.
B: The kneaded material appears slightly turbid when melted at a high temperature.
C: The kneaded material is opaque when melted at a high temperature.

—Fixability (Hot Offset-Occurring Temperature)—

The developer thus obtained was charged into an apparatus obtained by modifying copying machine "AR-505" (manufactured by Sharp Corporation) (printing speed: 50 sheets/min), and while the temperature of the fixing roller was gradually raised from 90° C. to 200° C., image printing was carried out. After image printing was carried out at various temperatures, white transfer paper was continuously sent to the fixing roller under the same conditions, and the temperature of the fixing roller at which toner contamination on the white paper occurred for the first time was determined as the hot offset-occurring temperature.

—Glossiness and Glossiness Unevenness—

For the images obtained by the technique described above (fixing roller temperature: 170° C.), the glossiness of solid sections was analyzed using a gloss meter manufactured by MURAKAMI COLOR RESEARCH LABORATORY. For the measurement, the incident light density entering at an angle of 45° with respect to the image surface, and the reflected light density at 135° were respectively measured at various temperatures, and the ratio of the reflected light density with respect to the incident light density was designated as glossiness. A glossiness of 50% or greater is preferred since high quality color image suitability is exhibited.

Furthermore, in regard to glossiness unevenness of the fixed images, the glossiness unevenness of solid image sections was visually evaluated based on the following criteria.

A: No unevenness was confirmed.
B: Clear unevenness was confirmed.

TABLE 1

| Test No. | Polymer | Molecular weight | Molecular-weight distribution | TG [° C.] | Acid value [mgKOH/g] | Content percentage of the aromatic ring | Emulsified material particle size | Evaluation |
|---|---|---|---|---|---|---|---|---|
| 101 | P-1 | 7,050 | 3.3 | 63 | 15 | 21 | 112 nm | A |
| 102 | P-3 | 8,330 | 3.4 | 59 | 20 | 22 | 125 nm | A |
| 103 | P-7 | 14,600 | 3.2 | 52 | 13 | 15 | 104 nm | A |
| 104 | P-8 | 14,700 | 3.3 | 61 | 11 | 15 | 109 nm | A |
| 105 | P-13 | 15,300 | 2.9 | 64 | 12 | 14 | 99 nm | A |
| 106 | P-15 | 18,400 | 3.4 | 43 | 13 | 8 | 110 nm | A |
| 107 | P-16 | 13,800 | 3.2 | 50 | 25 | 12 | 165 nm | A |
| 108 | P-20 | 12,700 | 3.3 | 57 | 11 | 13 | 100 nm | A |
| 109 | P-21 | 12,000 | 3.1 | 59 | 12 | 14 | 102 nm | A |
| 110 | P-22 | 20,080 | 3.4 | 56 | 5 | 12 | 170 nm | A |
| 111 | P-23 | 9,700 | 3.0 | 58 | 14 | 14 | 103 nm | A |
| 112 | P-27 | 10,500 | 2.8 | 53 | 13 | 5 | 118 nm | A |
| 113 | P-28 | 15,400 | 3.1 | 51 | 12 | 4 | 110 nm | A |
| 114 | P-29 | 13,000 | 3.3 | 65 | 13 | 30 | 111 nm | A |
| 115 | P-30 | 13,400 | 3.2 | 60 | 4 | 15 | 220 nm | B |
| 116 | P-31 | 12,000 | 3.4 | 60 | 26 | 16 | 190 nm | B |
| c11 | cP-1 | 4,000 | 3.7 | 58 | 5 | 41 | 105 nm | A |
| c12 | cP-2 | 14,200 | 3.2 | 51 | 12 | 0 | 110 nm | A |
| c13 | cP-3 | 13,200 | 3.1 | 68 | 13 | 18 | 280 nm | C |

| Test No. | Crystalline resin | Compatibility | Hot offset temperature | Glossiness [%] | Glossiness unevenness |
|---|---|---|---|---|---|
| 101 | (I) | AA | >200° C. | 86 | A |
| 102 | (II) | AA | >200° C. | 84 | A |
| 103 | (I) | AA | 200° C. | 87 | A |
| 104 | (I) | AA | >200° C. | 80 | A |
| 105 | (I) | AA | >200° C. | 82 | A |
| 106 | (II) | A | 200° C. | 72 | A |
| 107 | (I) | AA | >200° C. | 78 | A |
| 108 | (I) | AA | >200° C. | 80 | A |

TABLE 1-continued

| | | | | | |
|---|---|---|---|---|---|
| 109 | (I) | AA | >200° C. | 82 | A |
| 110 | (II) | AA | >200° C. | 77 | A |
| 111 | (I) | AA | >200° C. | 84 | A |
| 112 | (II) | A | 200° C. | 75 | A |
| 113 | (I) | A | 190° C. | 70 | A |
| 114 | (I) | AA | 190° C. | 84 | A |
| 115 | (I) | AA | >200° C. | 75 | A |
| 116 | (II) | AA | >200° C. | 72 | A |
| c11 | (I) | AA | >200° C. | 77 | A |
| c12 | (I) | C | 170° C. | 56 | B |
| c13 | (I) | C | 170° C. | 54 | B |

As can be seen from the results described above, it is found that the resins of the present invention (Examples) exhibited satisfactory compatibility with crystalline resins and is suitable as a toner material. Furthermore, in regard to the fixability of the toner and particularly the image quality of color images, it is found that the resins exhibit excellent performance. Furthermore, the resin of the present invention contributes to maintenance of the global environment by using compounds of plant origin.

Example 2 and Comparative Example 2

Various tests were carried out in the same manner, except that the PE-1 used in Test 101 was changed as indicated in the following table. As a result, "Good" results were obtained in the various tests for all of the test specimens.

| | |
|---|---|
| Hot offset: 190° C. or higher | Good |
| Glossiness: 75 or more | Good |
| Glossiness unevenness: Received A according to the evaluation described above | Good |
| Other than those | Bad |

TABLE 2-1

| | | Dicarboxylic acid | | | | | Glossiness | Glossiness unevenness |
|---|---|---|---|---|---|---|---|---|
| No. | formula | $L^{11}$ | $L^{13}$ | $L^{12}$ | Diol | Hot offset | Glossiness | unevenness |
| 201 | A1 | *-$L^{13}$-CO—** | L1-ex-10 | CO | b-2 | Good | Good | Good |
| 202 | A1 | *-$L^{13}$-CO—** | L1-ex-11 | CO | b-2 | Good | Good | Good |
| 203 | A1 | *-$L^{13}$-CO—** | L1-ex-12 | CO | b-2 | Good | Good | Good |
| 204 | A1 | *-$L^{13}$-CO—** | L1-ex-14 | CO | b-2 | Good | Good | Good |
| 205 | A1 | *-$L^{13}$-CO—** | L1-ex-17 | CO | b-2 | Good | Good | Good |
| 206 | A1 | CO | — | CO | B1-ex-1 | Good | Good | Good |
| 207 | A1 | CO | — | CO | B1-ex-2 | Good | Good | Good |
| 208 | A1 | CO | — | CO | B1-ex-3 | Good | Good | Good |

TABLE 2-2

| | | Dicarboxylic acid | | | | | Glossiness | Glossiness unevenness |
|---|---|---|---|---|---|---|---|---|
| No. | formula | $L^{21}$ | $L^{22}$ | $L^{23}$ | Diol | Hot offset | Glossiness | unevenness |
| 301 | A2 | CO | CO | L2-ex-1 | b-2 | Good | Good | Good |
| 302 | A2 | CO | CO | L2-ex-3 | b-2 | Good | Good | Good |
| 303 | A2 | CO | CO | L2-ex-4 | b-2 | Good | Good | Good |
| 304 | A2 | CO | CO | L2-ex-5 | b-2 | Good | Good | Good |
| 305 | A2 | CO | CO | L2-ex-9 | b-2 | Good | Good | Good |
| 306 | A2 | CO | CO | L2-ex-11 | b-2 | Good | Good | Good |
| 307 | A2 | CO | CO | L2-ex-13 | b-2 | Good | Good | Good |
| 308 | A2 | CO | CO | L2-ex-2 | B1-ex-1 | Good | Good | Good |
| 309 | A2 | CO | CO | L2-ex-2 | B1-ex-2 | Good | Good | Good |
| 310 | A2 | CO | CO | L2-ex-2 | B1-ex-3 | Good | Good | Good |

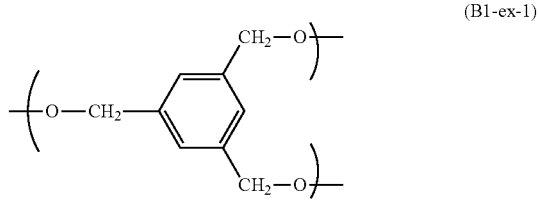

(B1-ex-1)

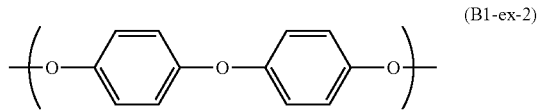

(B1-ex-2)

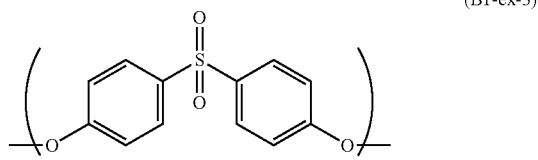

(B1-ex-3)

Having described our invention as related to the present embodiments, it is our intention that the present invention not be limited by any of the details of the description, unless otherwise specified, but rather be construed broadly within its spirit and scope as set out in the accompanying claims.

This application claims priority on Patent Application No. 2011-163683 filed in Japan on Jul. 26, 2011, which is entirely herein incorporated by reference.

REFERENCE SIGNS LIST

1 Photoreceptor (latent image holding body)
2 Toner supply chamber
3 Drum
4 Paper
5 Toner 51 Transferred image
7 Cleaner
8 Charging means
9 Charge remover
L Exposure

The invention claimed is:

1. A resin composed of a particular polymer, the particular polymer comprising: a repeating unit containing a structure derived from a dehydroabietic acid and represented by the following formula (A2), a structural unit represented by the following formula (I), and an aromatic ring-containing structural unit represented by the following formula (IIa) in the main chain:

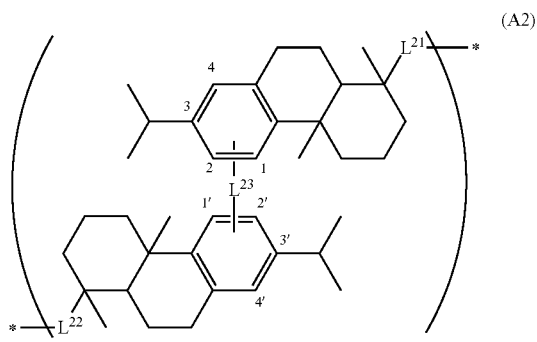

wherein, in formula (A2), $L^{21}$, $L^{22}$ and $L^{23}$ represent a divalent linking group; and * represents a bond;

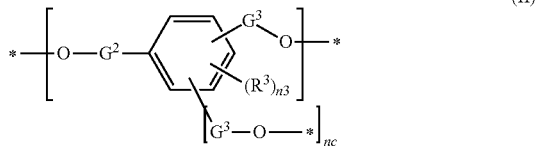

wherein, in formula (I), $G^1$ represents an alkylene group or alkenylene group having a total carbon number of 4 or greater; X, Y, and Z each independently represent a divalent linking group selected from the group consisting of —O—, —S—, —NR—, —(C=O)—, —O(C=O)—, —(C=O)O—, —(C=O)NR—, and any combination thereof; R is a hydrogen atom, an alkyl group or an alkenyl group; the total carbon number is meant to include, when the alkylene group or alkenylene group has a substituent, the number of carbon atoms of that substituent; mz represents an integer of 0 to 3; and * represents a bond incorporated in its main chain:

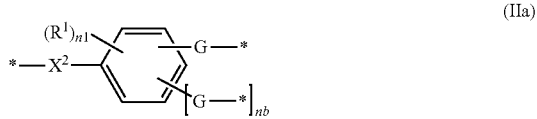

wherein, in formula (IIa), $R^1$ represents a substituent; $X^2$ represents a divalent linking group; G represents a divalent linking group; n1 represents an integer of 0 to 4; nb represents an integer of 0 to 3; and * represents a bond incorporated in its main chain;

wherein the copolymerization ratio of the repeating unit containing a structure derived from a dehydroabietic acid is 5% to 40% in a molar ratio; the copolymerization ratio of the structural unit represented by formula (I) is 10 to 80% in a molar ratio; and the copolymerization ratio of the repeating unit represented by formula (IIa) is 5% to 65% in a molar ratio; and wherein the content percentage of the aromatic ring of the aromatic ring-containing structural unit in the particular polymer is from 5% by mass to 30% by mass relative to the total amount of the resin.

2. The resin according to claim 1, wherein $L^{21}$ and $L^{22}$ in formula (A2) each are —(C=O)—* or —(C=O)O—*; and * represents the site of a bond in the formula.

3. The resin according to claim 1, wherein the aromatic ring-containing structural unit represented by formula (IIa) is an aromatic ring-containing structural unit represented by represented by the following formula (II):

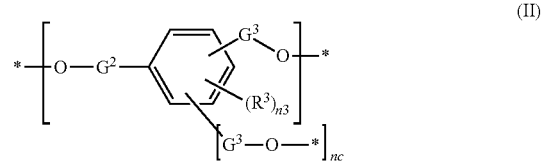

wherein $G^2$ and $G^3$ each represent a divalent linking group; $R^3$ represents a substituent; n3 represents an integer of 0 to 4; nc represents an integer of 0 to 3; and * represents a bond incorporated in its main chain.

4. The resin according to claim 1, wherein the aromatic ring-containing structural unit represented by formula (IIa) is an aromatic ring-containing structural unit represented by formula (III):

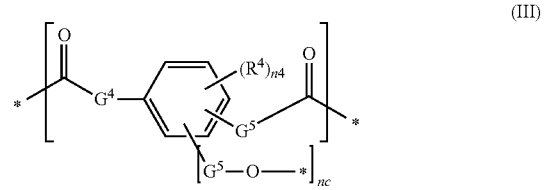

wherein $G^4$ and $G^5$ each represent a divalent linking group; $R^4$ represents a substituent; n4 represents an integer of 0 to 4; nc represents an integer of 0 to 3; and * represents a bond incorporated in its main chain.

5. The resin according to claim 1, wherein the resin has an acid value from 5 mg KOH/g to 25 mg KOH/g.

6. The resin according to claim 1, wherein the resin has a weight average molecular weight from 7,000 to 70,000.

7. An aqueous resin dispersion comprising the resin according to claim 1 in an aqueous medium.

8. A resin composition comprising the resin according to claim 1 and a crystalline resin.

9. The resin composition according to claim 8, wherein the crystalline resin is a crystalline polyester.

10. A toner comprising the resin according to claim 1, a crystalline resin, and a colorant.

11. A method for producing a resin composition, the method comprising mixing the resin according to claim 1 and another resin, each in an emulsified and dispersed state, and aggregating the resins.

* * * * *